US009463383B2

(12) United States Patent
Kopans

(10) Patent No.: US 9,463,383 B2
(45) Date of Patent: Oct. 11, 2016

(54) COMPUTER SYSTEM AND METHOD FOR GENERATING, EXCHANGING, AND VALUING SOCIAL CURRENCY

(71) Applicant: PF Loop Inc., Arlington, MA (US)

(72) Inventor: David Kopans, Arlington, MA (US)

(73) Assignee: PF Loop Inc., Arlington, MA (US)

( * ) Notice: Subject to any disclaimer, the term of this patent is extended or adjusted under 35 U.S.C. 154(b) by 17 days.

(21) Appl. No.: 14/454,915

(22) Filed: Aug. 8, 2014

(65) Prior Publication Data

US 2015/0057073 A1 Feb. 26, 2015

Related U.S. Application Data

(60) Provisional application No. 61/868,754, filed on Aug. 22, 2013.

(51) Int. Cl.
*A63F 13/46* (2014.01)
*G06Q 50/00* (2012.01)

(52) U.S. Cl.
CPC .............. *A63F 13/46* (2014.09); *G06Q 50/01* (2013.01)

(58) Field of Classification Search
CPC ....................................................... A63F 13/46
USPC ......................................................... 463/25
See application file for complete search history.

(56) References Cited

U.S. PATENT DOCUMENTS

| 8,757,482 | B2 | 6/2014 | Abecassis | |
| 2005/0192097 | A1* | 9/2005 | Farnham et al. | 463/42 |
| 2009/0099924 | A1* | 4/2009 | Lensch | G06Q 10/101 705/14.13 |
| 2011/0107239 | A1* | 5/2011 | Adoni et al. | 715/757 |
| 2012/0221563 | A1* | 8/2012 | De | G06Q 10/06311 707/728 |
| 2013/0006709 | A1* | 1/2013 | Kosta | G07F 17/3206 705/7.29 |
| 2013/0290226 | A1* | 10/2013 | Dokken | G06Q 10/0637 706/12 |
| 2013/0311484 | A1* | 11/2013 | Zhou | G06F 17/30864 707/748 |

FOREIGN PATENT DOCUMENTS

| WO | 2009135187 A1 | 11/2009 |
| WO | 2013086399 A1 | 6/2013 |

* cited by examiner

*Primary Examiner* — David L Lewis
*Assistant Examiner* — Shauna-Kay Hall
(74) *Attorney, Agent, or Firm* — Robert Plotkin, P.C.; Robert Plotkin

(57) ABSTRACT

A computer system creates, stores, transmits, modifies, and enables users to exchange units of social currency, referred to as "social currency events" (SCEs). Each SCE represents social approval and/or disapproval of a behavior of one or more users by the same user or one or more other users. The users who send and receive an SCE may each assign their own distinct values to it. The computer system may generate various metrics based on one or more SCEs. For example, the computer system may generate a single SCE score for a user based on variables such as the number and value of SCEs the user has sent and received. SCEs may be used to recognize positive and/or negative social behaviors by users of the system, to encourage such users to engage in additional positive social behaviors, and to discourage such users from engaging in additional negative social behaviors.

16 Claims, 26 Drawing Sheets

900

Request Ability to Follow Someone's SCEs:

| First | Last | Email | Family | Friend | Co-Worker | Boss | Other User Assignable |
|---|---|---|---|---|---|---|---|
| Purple | Grape | Purple@email | ☑ | | | | |

Include a Message:

Dear <Name Automatically Inserted>:

It would be great if I could follow your SCEs.

How about it?

- Purple

☐ Summary
☑ Detailed

Request to Follow

Manage Who You Are Tracking:

| First | Last | Main Category | Follower Status | Select |
|---|---|---|---|---|
| Orange | Pumpkin | Friend | Summary | ☑ |
| Blue | Berry | Co-Worker | Summary | ☐ |

Search: [_____] [Search List]

Action:
[Open Tracking File (to Update)]  [Follow Someone New]
[Stop Tracking]

Manage Your Automatic SCEs:

| SCE Name | Category | Value per SCE | SCE Status | Select |
|---|---|---|---|---|
| Relax on Vacation | Personal | 100 | Active | ☑ |
| Go to Gym | Health | 1,000 | Inactive | ☐ |
| Clean Room | Home | 10 | Inactive | ☐ |

Search: [                    ]  Search List

Action:

[Open Automatic SCE File (to Update)]  [Create New Automatic SCE]

[Delete]

*FIG. 14*

Manage Everyone Who has Sent or Received a SCE:

| First | Last | SCEs Sent | SCEs Received | Main Category | Follower Status | Select |
|---|---|---|---|---|---|---|
| Orange | Pumpkin | 9 | 15 | Friend | Summary | ☑ |
| Red | Apple | 2 | - | Co-Worker | Summary | ☐ |
| Purple | Grape | - | 5 | Family | Detailed | ☐ |
| Green | Kiwi | 5 | 5 | Boss | Summary | ☐ |
| Brown | Banana | - | 1 | Stranger | | ☐ |

Search: [_____] Search List

Action:
Open File (to Update) | Invite Someone New

| To: | Yellow, Red, Green, Purple | 1602 |
|---|---|---|

SCE Name: Practice the Cello

SCE Description:
Did you practice your cello today?

SCE Category:
Dropdown Menu
Music Students
Health
<User Definable>

☐ Private SCE

Alert Time: HH:MM

Location Trigger: Location
☐ Upon Arrival
☑ Upon Departure

Recurrence Pattern
☐ One Time
☑ Daily
☐ Weekly

Start Date: XX / XX / XXXX
End Date: XX / XX / XXXX
Value Your SCE: 100
Effort Rank: 5

Save

| First | SCEs Sent | SCEs Received | Net Score | "Ratio" |
|---|---|---|---|---|
| Orange | 9 | 15 | -6 | 0.6 |
| Red | 2 | - | +2 | 2+ |
| Purple | - | 5 | -5 | 5- |
| Green | 5 | 5 | 0 | 1 |
| Overall | 16 | 25 | -9 | 0.6 |

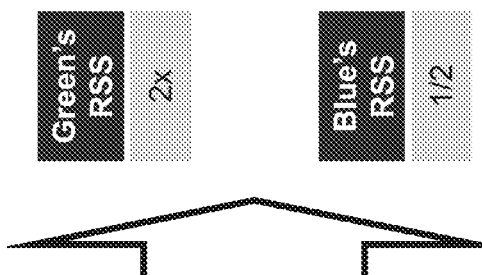
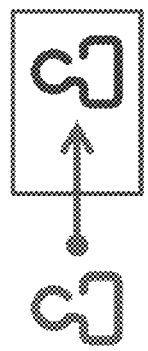
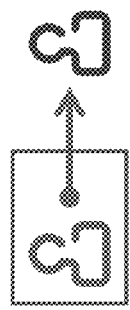
FIG. 21

| Name | SCE Score | Value of SCEs Sent | Other Score 2 |
|---|---|---|---|
| YOU (Blue) | 87 | 100 | 5 |
| World | 56 | 200 | 10 |
| Family | 92 | 50 | 1 |
| Purple | 45 | 1,000 | 6 |
| Green | 87 | 75 | -12 |
| Yellow | 22 | 10 | -5 |

| Description | Example |
|---|---|
| Number | 8 |
| Lengths / coloring of bars |  |
| Icons: |  |
FIG. 25

COMPUTER SYSTEM AND METHOD FOR GENERATING, EXCHANGING, AND VALUING SOCIAL CURRENCY

BACKGROUND

Computer systems exist for enabling users to express approval and disapproval of organizations, products, services, and content. For example, many e-commerce sites enable users to post reviews of businesses and of particular products and services. As another example, many social media sites enable users to indicate their approval or disapproval of particular organizations, products, services, and content. Facebook's "like" feature is an example of such a mechanism. Sites often generate statistics based on such user feedback, such as the average rating for a particular product or the total number of likes received by a particular web site, and display such statistics to the public.

Although such feedback mechanisms are useful, they are limited in functionality. For example, such feedback mechanisms are only useful for enabling users to provide feedback on organizations, products, services, and content.

SUMMARY

A computer system creates, stores, transmits, modifies, and enables users to exchange units of social currency, referred to as "social currency events" (SCEs). Each SCE represents social approval and/or disapproval of a behavior of one user by the same user or another user. The user who creates and sends an SCE may assign a first value to it. The user who receives the SCE may assign a second value to it. The first and second values may be the same as or differ from each other. The computer system may generate various metrics based on one or more SCEs. For example, the computer system may generate a single SCE score for a user based on variables such as the number and value of SCEs the user has sent and received. SCEs may be used to recognize positive and/or negative social behaviors by users of the system, to encourage such users to engage in additional positive social behaviors, and to discourage such users from engaging in additional negative social behaviors.

For example, one embodiment of the present invention is directed to a method comprising: (A) receiving data representing a first count of a first plurality of social currency event data structures created by a first user, wherein the first plurality of social currency event data structures includes data representing first values of the first plurality of social currency event data structures to the first user; (B) receiving data representing a second count of a second plurality of social currency event data structures addressed to the first user, wherein the second plurality of social currency event data structures includes data representing second values of the second plurality of social currency event data structures to the first user; and (C) calculating a score associated with the first user based on at least two of the first count, the second count, the first values, and the second values.

Another embodiment of the present invention is directed to a method comprising: (A) receiving data representing a first plurality of social currency event data structures, wherein the first plurality of social currency event data structures includes: data representing first values of the first plurality of social currency event data structures to a first plurality of users; data representing second values of the first plurality of social currency event data structures to a second plurality of users; and data representing a first plurality of existing values of at least one first field shared by the first plurality of social currency event data structures; (B) identifying a first subset of the first plurality of social currency event data structures based on the first plurality of existing values of the at least one first field shared by the plurality of social currency event data structures; (C) calculating a first value of a statistic based on the first subset of the first plurality of social currency event data structures; (D) identifying a first plurality of existing values of a second field shared by the first plurality of social currency event data structures; and (E) calculating a first plurality of normalized values of the second field based on the first value of the statistic and the first plurality of existing values of the second field.

Other features and advantages of various aspects and embodiments of the present invention will become apparent from the following description and from the claims.

BRIEF DESCRIPTION OF THE DRAWINGS

FIG. 9 illustrates a dialog box that is used to receive input from an SCEAH to generate a request by the SCEAH to become a follower of another SCEAH according to one embodiment of the present invention;

FIG. 10 illustrates a dialog box that is used to display information to an SCEAH about that SCEAH's followers and to receive input from the SCEAH to manage the SCEAH's followers according to one embodiment of the present invention;

FIG. 11 illustrates a dialog box that is used to display information to an SCEAH about who that SCEAH is following and to receive input from the SCEAH to manage the SCEAHs who the SCEAH is following according to one embodiment of the present invention;

FIG. 14 illustrates a dialog box that is used to display information to an SCEAH about that SCEAH's self-directed SCEs and to receive input from the SCEAH to manage the SCEAH's self-directed SCEs according to one embodiment of the present invention;

FIG. 15 illustrates a dialog box that is used to display information to an SCEAH about SCEs that the SCEAH has created and/or received according to one embodiment of the present invention;

FIG. 16 illustrates a dialog box that is used to provide SCE creation input for creating an multi-SCEAH automatically-triggered SCE according to one embodiment of the present invention;

FIG. 17 illustrates a dialog box that is used to display information to an SCEAH about recurring SCEs that the SCEAH has created according to one embodiment of the present invention;

FIG. 21 illustrates the calculation of a sender-recipient value ratio and of a recipient-sender value ratio for a particular SCE according to one embodiment of the present invention;

FIG. 25 illustrates examples of visual output representing scores calculated by various embodiments of the present invention.

DETAILED DESCRIPTION

Financial currency has shaped human civilization. It has facilitated trade, enabled economic value creation to be measured, and enabled financial wealth to be stored. Traditional financial currency, however, fails to account for, embrace, and encourage a variety of fundamental components of human social interactions. Embodiments of the present invention address these problems with traditional financial currency by providing computer-implemented systems and methods for creating, storing, exchanging, valuing, and performing other operations on a new kind of social currency, which has features and benefits that differ fundamentally from those of traditional financial currencies. Individual instances of such social currency are referred to herein as "social currency events."

Figure 1A:
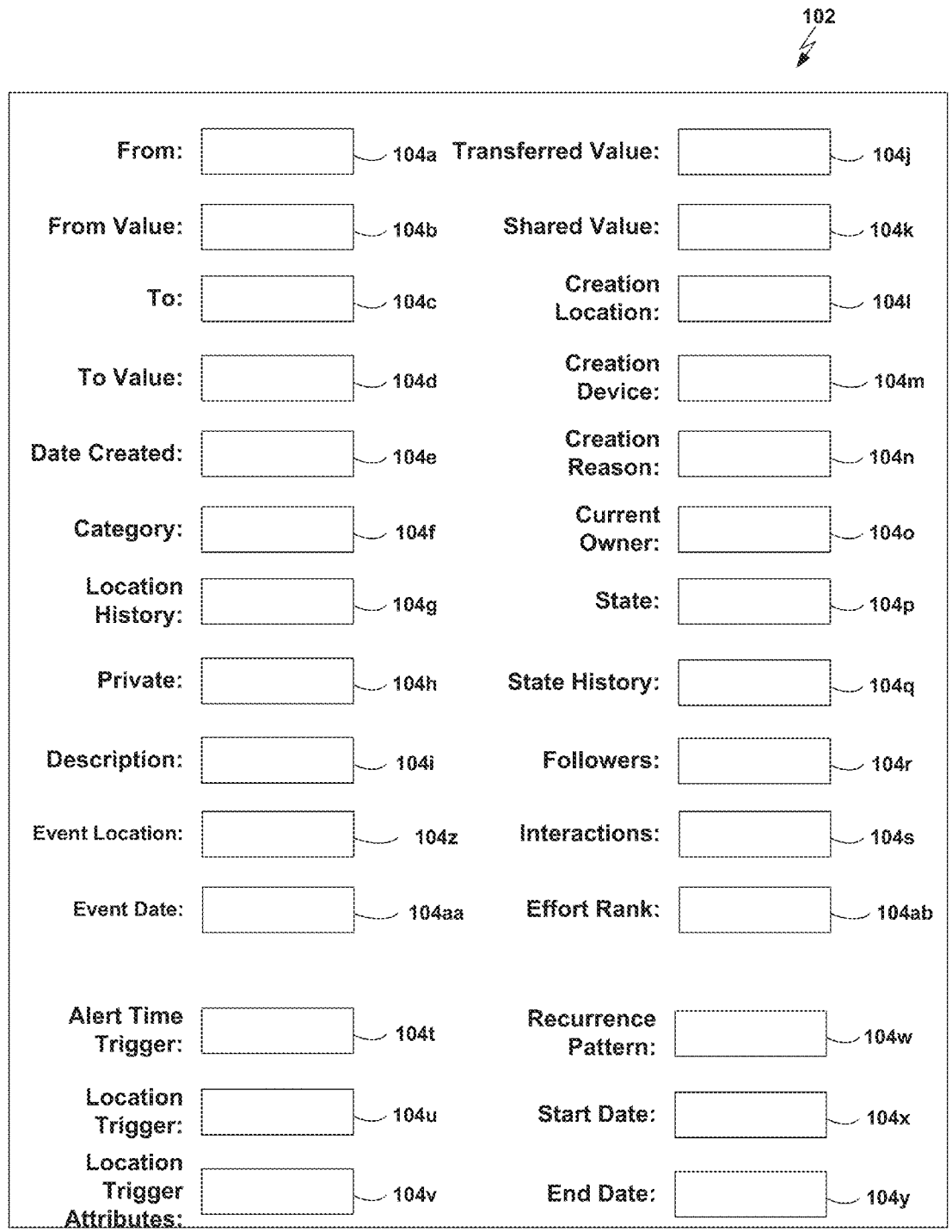
FIG. 1A is an illustration of a template of a data structure that is used to store social currency elements (SCEs) according to one embodiment of the present invention.

Embodiments of the present invention may create and otherwise manage a plurality of SCEs. Each SCE may, for example, be stored in a non-transitory computer-readable medium, such as in a data structure stored in a disk drive, memory (e.g., RAM or flash memory), or optical storage medium. Referring to FIG. 1A, an illustration is shown of a template of a data structure 102 that may be used to store SCEs. The element 102 in FIG. 1A is referred to herein as a template because it is intended to illustrate the structure (e.g., fields and data types) that may be used to store SCEs, rather than to illustrate any particular values of those fields. Particular instances of the data structure template 102 may contain particular values in some or all of the fields shown in FIG. 1A. For ease of explanation, the element 102 may be referred to herein simply as a data structure, rather than as a data structure template.

As will become clear from the description herein, the computer implementation of embodiments of the present invention is not merely incidental to the present invention, but rather is an integral and inseparable part of the present invention. Although in theory it might be possible to implement certain aspects of embodiments of the present invention using non-computer-implemented currency, such implementations would be impractical at best and completely lacking in utility at worst. For example, embodiments of the present invention which calculate values of individual SCEs in real-time based on a wide variety of inputs received from large numbers of users over a computer network, and which then make such calculated values available to large numbers of users over a network (such as the Internet) instantaneously, would be entirely impractical to implement without the use of computers and telecommunication networks. The act of implementing embodiments of the present invention using one or more computers, therefore, does not merely implement in a computer certain features which would otherwise be implementable without a computer, but instead imbues embodiments of the present invention with features and benefits which would be lacking in non-computer implementations.

The term "social currency event account holder" (SCEAH) is used herein to refer to any entity that may have an account within the system 200, and which may, therefore, create, edit, delete, send, access and/or perform other actions on SCEs. A SCEAH may, for example, be a human, a computer program, a computing device, or any combination thereof. The values of the fields in any particular social currency event may be obtained from any such kind of SCEAH and/or from a non-SCEAH (such as a computer program that is not an SCEAH). A single SCE may include some fields having values obtained from a human user and other fields obtained from a computer program and/or computing device.

The data structure 102 may contain any one or more of the following fields (in which "the SCE" refers to a social currency event that is an instance of the data structure 102):

"From" field 104a: The value of the "from" field 104a of an SCE represents one or more senders of the SCE. For example, if user Green sends an SCE to user Blue, then the value of the "from" field 104a of the SCE may represent user Green. The value of the "from" field 104a may represent the sender in any of a variety of ways, such as by including any one or more of the real name, email address or other online identifier, mailing address, telephone number, or other unique identifier of the sender.

"From Value" field 104*b*: The value of the "from value" field 104*b* of an SCE represents a value assigned by each of the senders (i.e., the user represented by the "from" field 104*a* of the instance of the data structure 102) to the SCE. The values assigned by multiple senders of the instance of the data structure 102 may be the same as or differ from each other.

"To" field 104*c*: The value of the "to" field 104*c* of an SCE represents one or more recipients of that SCE. For example, if user Green sends the SCE to user Blue, then the value of the "to" field 104*c* of the instance may represent user Blue. The value of the "to" field 104*c* may represent the recipient in any of a variety of ways, such as in any of the ways described above with respect to the "from" field 104*a*.

"To Value" field 104*d*: The value of the "to value" field 104*d* of an SCE represents a value assigned by each of the recipients (i.e., the user represented by the "to" field 104*c* of the SCE) to the SCE. The values assigned by multiple recipients of the SCE may be the same as or differ from each other. As will be described in more detail below, a derived value of an SCE may be derived from multiple values assigned to the SCE by multiple parties, such as the "From Value" assigned by the sender of the SCE and the "To Value" assigned by the recipient of the SCE. Generating and assigning such a derived value to a unit of currency based on multiple values assigned to that currency by multiple parties differs fundamentally from the way in which traditional financial currencies are valued.

"Date" field 104*e*: The value of the "date" field 104*e* of an SCE represents a date and time of creation of the SCE by the sender of the SCE.

"Category" field 104*f*: The value of the "category" field 104*f* of an SCE represents a class, category, tag, or label of the SCE. The value of the category field 104*f* may represent multiple classes, categories, tags, or labels. Categories that may be assigned to an SCE may include system-defined and/or user-defined categories. Categories may, for example, represent relationships between SCEAHs (e.g., the sender 202 and recipient 204 of an SCE), such as family, friend, co-worker, boss, and direct report. Although only one category field 104*f* is shown in FIG. 1 for purposes of example, an SCE may include multiple category fields, such as a distinct category field for each SCEAH associated with the SCE (e.g., the sender 202 and the recipient 204 of the SCE). The values of such distinct category fields may be the same as or differ from each other. For example, if the sender 202 and recipient 204 are brothers, then the category field 104*f* of the SCE may contain a value of "family" for the sender 202 and a value of "family" for the recipient 204. As another example, if the sender 202 is the boss of the recipient 204, then the category field 104*f* of the SCE may contain a value of "boss" for the sender and a value of "direct report" for the recipient 204.

"Creation Location" field 104*l*: The value of the "creation location" field 104*l* of an SCE represents a location associated with the creation of the SCE, such as a location of the device used by the sender of the SCE to create the SCE. Location information stored in fields 104*g* and/or 104*l* may include any one or more of the following: latitude and longitude; street address; generic name of a location (e.g., "Work," "Home," "Gym," "Restaurant"); and specific name of a location (e.g., "State Treasurer's Office," "Home in Arlington," "NY Athletic Club," "The Elephant Walk Restaurant").

"Location History" field 104*g*: The value of the "location history" field 104*g* of an SCE represents one or more locations associated with the SCE over time. Location information stored in fields 104*g* and/or 104*l* may include any one or more of the following: latitude and longitude; street address; generic name of a location (e.g., "Work," "Home," "Gym," "Restaurant"); and specific name of a location (e.g., "State Treasurer's Office," "Home in Arlington," "NY Athletic Club," "The Elephant Walk Restaurant").

"Private" field 104*h*: The value of the "private" field 104*h* of an SCE indicates whether or not the SCE (or certain fields therein) is private. A private SCE may be accessible by only the SCE's sender and recipient, whereas a non-private SCE may be accessible by anyone, including people other than the instance's sender and recipient. The private field 104*h* of an SCE may include information specifying which of the fields in the SCE are private.

"Description" field 104*i*: The value of the "description" field 104*i* of an SCE represents a human-readable description of the SCE.

"Transferred Value" field 104*j*: The value(s) of the "transferred value" field 104*j* of an SCE represents the value(s) assigned to that instance by the SCEAH(s) to which the SCE was transferred. The values assigned by multiple transferees of an SCE may be the same as or differ from each other.

"Shared Value" field 104*k*: The value(s) of the "shared value" field 104*k* of an SCE represents the value(s) assigned to that instance by the SCEAH(s) with which the SCE was shared. The values assigned by multiple such SCEAHs may be the same as or differ from each other.

"Creation Device" field 104*m*: The value of the "creation device" field 104*m* of an SCE represents information about the device that was used to create the SCE, such as one or more of the following: physical device type (e.g., make and/or model, such as iPhone 4S); operating system type and/or version number (e.g., iOS 5.1.1); MAC address and/or IP address; and creation application and/or version number (e.g., SNAP v1.0).

"Creation Reason" field 104*n*: The value of the "creation reason" field 104*n* of an SCE represents one or more reasons for creating the SCE.

"Current Owner" field 104*o*: The value of the "current owner" field 104*o* of an SCE indicates which SCEAH(s) is/are the current owner(s) of the SCE. When an SCE is created, the system 200 may designate the recipient 204 of the SCE as the SCE's current owner. Such ownership may change over time, however, in response to the SCE being rejected, ignored, transferred, or shared.

"State" field 104*p*: The value of the "state" field 104*p* of an SCE may contain data representing the current state of the SCE. Examples of state include: saved in draft form but not yet sent, sent and awaiting action by the recipient, and acted upon by the recipient (e.g., accepted, rejected, ignored, marked as spam, transferred, or shared).

"State History" field 104*q*: The "state history" field 104*q* of an SCE may contain data representing the past state of the SCE, including one or more actions performed on the SCE over time. For example, when a new value is stored in the "state" field 104*p*, the old value of the "state" field may be added to the "state history" field 104*q*. Such past states may be stored in the "state history" field 104*q* in a manner which enables their relative time of applicability to be determined, such as by storing a date and/or time in association with each such state. Additional contextual data may be stored in association with each such state, such as the location associated with the state (e.g., a location at which an action was performed), a device associated with the state (e.g., the device which performed an action), the reason for the state, etc. For each action stored in the state history field 104*q*, one or more of the following data may be stored: data representing the type of action that was performed (e.g., sent, accepted, rejected) and the SCEAH(s) associated with the action (e.g., the sender 202 and/or recipient 204).

"Followers" field 104*r*: The "followers" field 104*r* of an SCE may contain data representing all of the SCEAHs who are following or tracking the SCE, such as in the form of the user IDs of such SCEAHs.

"Interactions" field 104*s*: The "interactions" field 104*s* of an SCE may contain data representing statistics related to the SCE, such as the SCEAH IDs of SCEAHs who have interacted with the SCE, frequency of interactions with e.g., views of the SCE, locations of such interactions, and devices used to conduct such interactions.

"Event Location" field 104*z*: The "event location" field 104*z* of an SCE stores the physical location of the event upon which the SCE is based. Location information stored in field 104*z* may include any one or more of the following: latitude and longitude; street address; generic name of a location (e.g., "Work," "Home," "Gym," "Restaurant"); and specific name of a location (e.g., "State Treasurer's Office," "Home in Arlington," "NY Athletic Club," "The Elephant Walk Restaurant").

"SCE Date": The "event date" field 104*aa* of an SCE stores the date on which the event represented by the SCE was performed (e.g., completed). Although the values of the date created field 104*e* and the event date field 104*aa* may be the same as each other, they may differ from each other.

"Effort Rank": The "effort rank" field 104*ab* of an SCE stores data representing a level of effort that was required to complete the event upon which the SCE is based.

As will be described in more detail below with respect to FIGS. 12 and 16, the system 200 may create SCEs automatically in response to satisfaction of one or more trigger conditions. The following fields may be used in conjunction with such automatically-triggered SCEs:

"Alert Time Trigger" field 104*t*: The "alert time trigger" field 104*t* of an SCE may contain data representing a time condition (e.g., a particular time of day), the satisfaction of which will cause the system 200 to generate a copy of the SCE.

"Location Trigger" field 104*u*: The "location trigger" field 104*u* of an SCE may contain data representing a location condition (e.g., a particular named location or GPS coordinates), the satisfaction of which will cause the system 200 to generate a copy of the SCE.

"Location Trigger Attributes" field 104*v*: The "location trigger attributes" field 104*v* of an SCE may contain data representing one or more attributes of the location represented by the location trigger field 104*u*. Examples of location trigger attributes include "upon arrival" and "upon departure." If the "location trigger attributes" field 104*v* contains a value, then the system 200 will create a copy of the SCE only when the current location of the SCE's current owner satisfies the conditions specified by the "location trigger" field 104*u* and the "location trigger attributes" field 104*v*.

"Recurrence Pattern" field 104*w*: The "recurrence pattern" field 104*w* of an SCE may contain data representing a pattern according to which copies of the SCE should be generated by the system. Examples of values of the "recurrence pattern" field 104*w* include one time, daily, weekly, semi-annually, and annually.

"Start Date" field 104*x*: The "start date" field 104*x* of an SCE may contain data representing the date on which to start generating copies of the SCE.

"End Date" field 104*y*: The "end date" field 104*y* of an SCE may contain data representing the date on which to stop generating copies of the SCE.

The particular fields shown in FIG. 1A are merely an example and do not constitute a limitation of the present invention. Any particular SCE may contain all of the fields shown in FIG. 1A, some of the fields shown in FIG. 1A but not others, fields in addition to those shown in FIG. 1A, or any combination thereof. Any two SCEs may have the same or different fields as each other. For example, one SCE may have all of the fields shown in FIG. 1A, whereas another SCE may have all of the fields shown in FIG. 1A except for the creation location field 104*l*. The value of any particular field in one SCE may be the same as or differ from the value of the same field in another SCE.

Figure 1B:
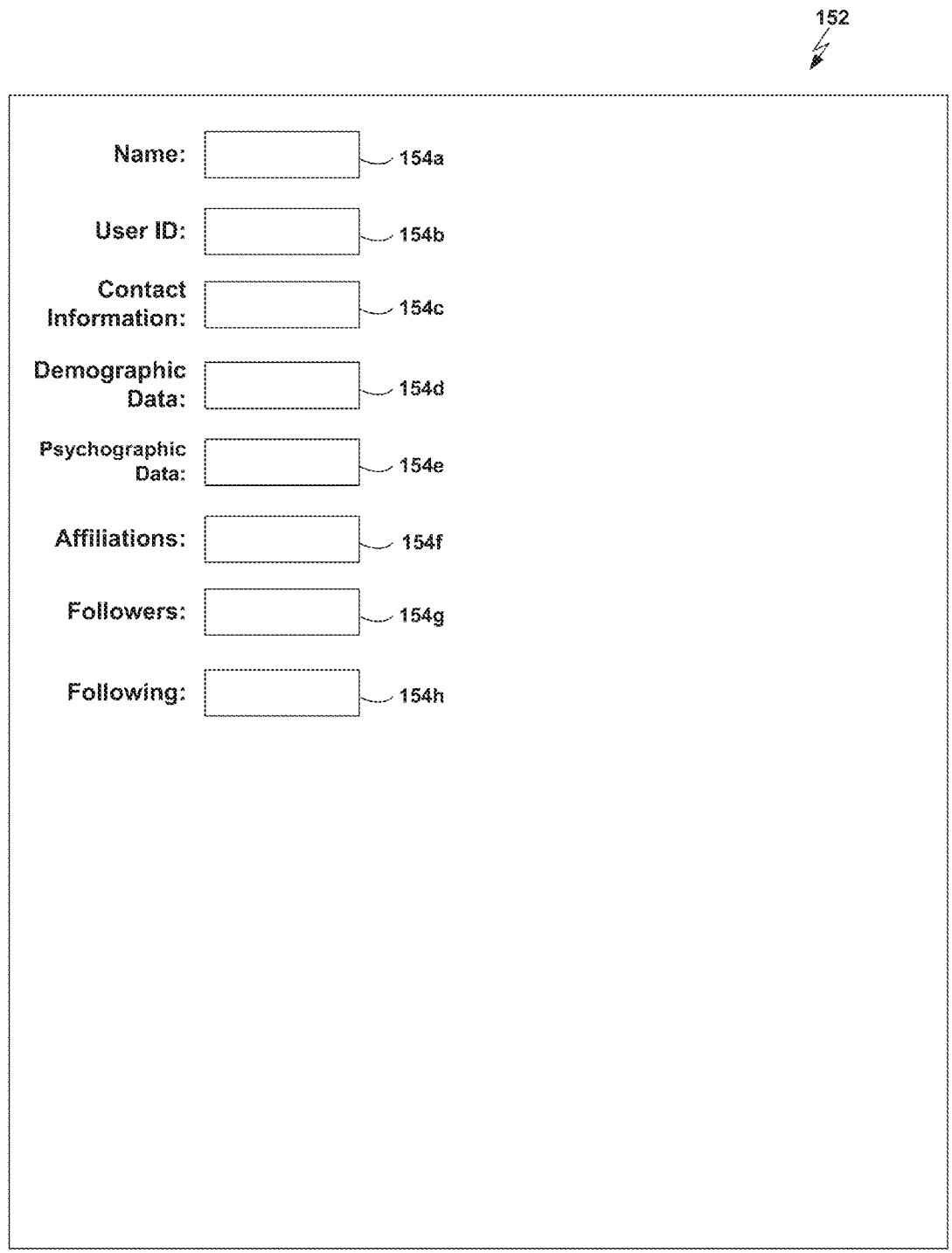
FIG. 1B is an illustration of a template of a data structure that is used to represent individual social currency element account holders (SCEAHs) according to one embodiment of the present invention.

Referring to FIG. 1B, an illustration is shown of a template of a data structure 152 that may be used to represent individual SCEAHs. As mentioned above, an SCEAH may be human or non-human (e.g., a computer program or computing device). The values of the fields in any particular instance of the data structure 152 of FIG. 1B may be obtained from any kind of SCEAH and/or from a non-SCEAH (such as a computer program that is not an SCEAH). A single instance of the data structure 152 of FIG. 1B may include some fields having values obtained from a human user and other fields obtained from a computer program and/or computing device. Although the data structure 152, and instances thereof, may be referred to herein as "SCEAHs" for ease of explanation, it should be understand that an SCEAH is an account holder (such as a human account holder), whereas the data structure 152, and instances thereof, are data structures for representing SCEAHs. The data structure 152 may include the following fields:

"Name" field 154*a*: The value of the "name" field 154*a* of an SCEAH data structure may represent a name of the SCEAH (such as the real, human-readable, name of the SCEAH).

"Unique User ID" field 154*b*: The value of the "unique user ID" field 154*b* of an SCEAH data structure may represent an ID of the SCEAH data structure that is unique among all SCEAH data structures within the system 200.

"Contact Information" field 154*c*: The "contact information" field 154*c* of an SCEAH data structure contains contact information for the SCEAH, such as one or more of the following: email address, mailing address, and telephone number.

"Demographic Data" field 154*d*: The "demographic data" field 154*d* of an SCEAH data structure contains demographic data related to the SCEAH, such as one or more of the following: gender, age, ethnicity, race, education level(s), language proficiency, disability, home ownership, employment status, family size, occupation, employer, and income level.

"Psychographic Data" field 154e: The "psychographic data" field 154e of an SCEAH data structure contains psychographic data related to the SCEAH, such as one or more of the following: the SCEAH's personality, values, opinions, attitudes, interests, activities, and lifestyles.

"Affiliations" field 154f: The "affiliations" field 154f of an SCEAH data structure contains data representing one or more organizations with which the SCEAH is affiliated, such as one or more of the following: employers, colleges, sports teams, houses of worship, trade groups, professional organizations, clubs, fraternities, towns of residence, charities, and political parties.

"Followers" field 154g: The "followers" field 154g of an SCEAH data structure contains data representing the follower(s) of the SCEAH.

"Following" field 154h: The "following" field 154h of an SCEAH data structure contains data representing the SCEAHs being followed by the SCEAH represented by the SCEAH data structure.

Figure 2:
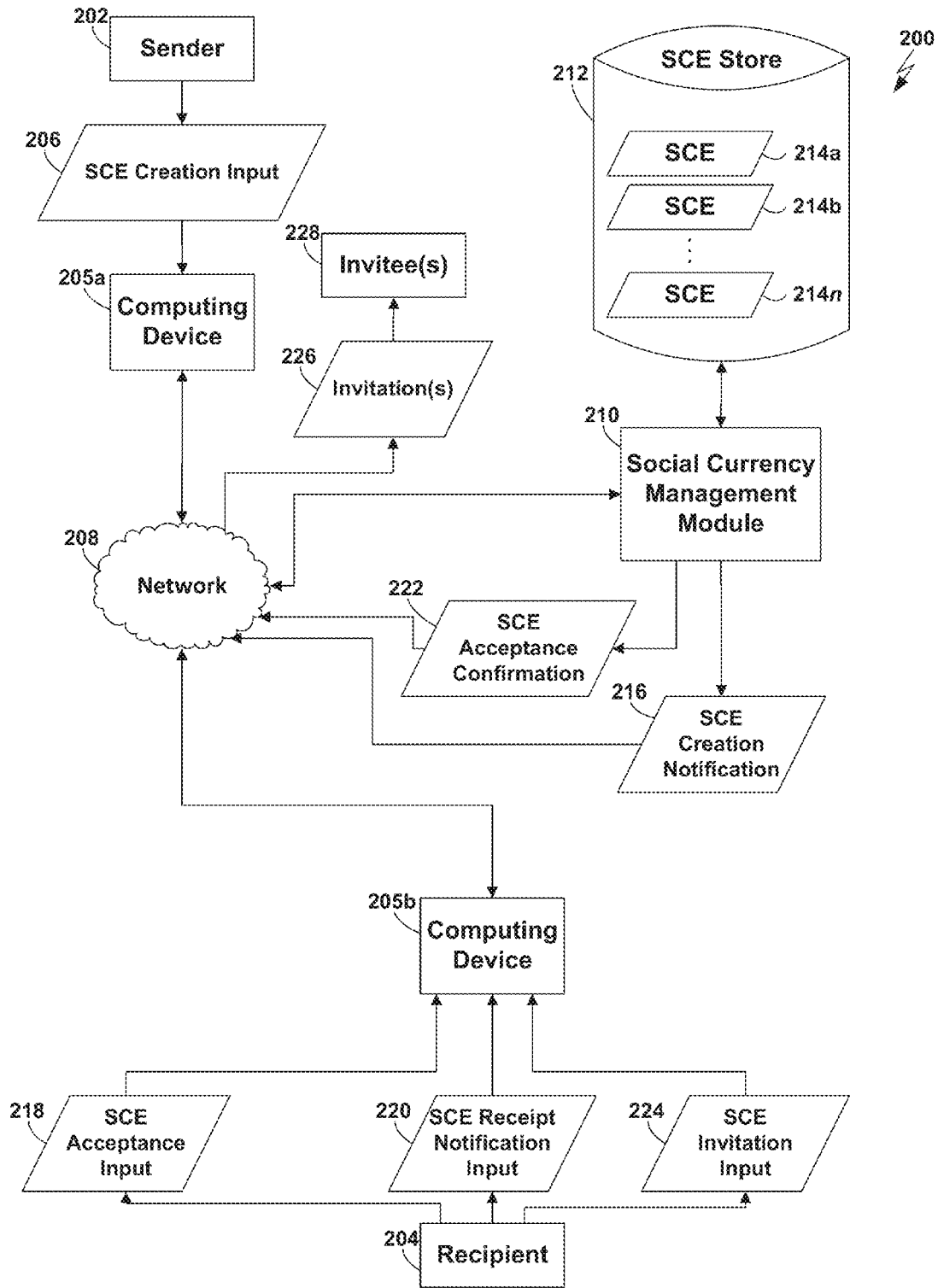
FIG. 2 is a dataflow diagram of a system for creating SCEs according to one embodiment of the present invention.
Figure 3:
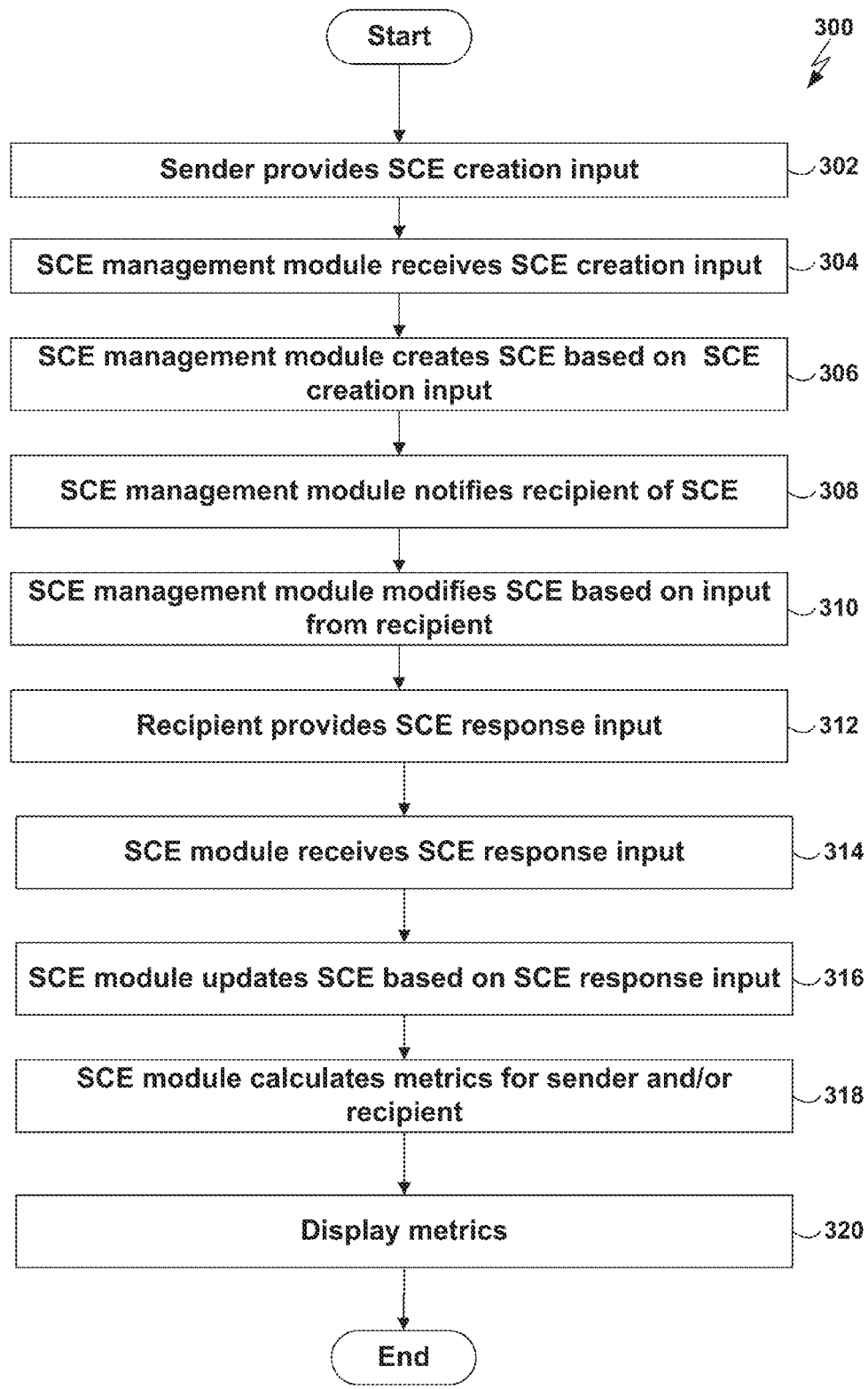
FIG. 3 is a flowchart of a method that is performed by the system of FIG. 2 according to one embodiment of the present invention.

Having generally described certain features of embodiments of data structures that may be used to implement SCEs and SCEAHs according to embodiments of the present invention, examples of techniques for creating and managing SCEs will now be described. Referring to FIG. 2, a dataflow diagram is shown of a system 200 for creating SCEs according to one embodiment of the present invention. Referring to FIG. 3, a flowchart is shown of a method 300 that is performed by the system 200 of FIG. 2 according to one embodiment of the present invention.

A first user 202 of the system 200 may use the system 200 to create a social currency event (SCE). As will be described in more detail below, the first user 202 may use the system 200 both to create the SCE and to cause the system 200 to send the SCE to a second user 204 of the system 200. For this reason, the first user 202 may be referred to herein as a "sender" of the SCE and the second user 204 may be referred to as a "recipient" of the SCE. Such labels, however, are merely illustrative and do not constitute limitations of the present invention. The first user 202 may, for example, create a SCE without sending it to another user. Whether or not a sender who creates an SCE sends that SCE to a recipient, the sender may do so for the purpose of: (1) praising, thanking, encouraging, or otherwise conveying a positive social message to and/or about the recipient; or, to the contrary, (2) discouraging and conveying a negative social message to and/or about the recipient.

The sender 202 provides SCE creation input 206 to a first computing device 205a (FIG. 3, operation 302). The computing device 205a, and any other computing device disclosed herein, may be any kind of computing device, such as a desktop computer, laptop computer, tablet computer, or smartphone. The social currency event creation input 206 may include any of a variety of data for storage in, or otherwise for use in the creation of, a data structure representing a new SCE. For example, the input 206 may include data representing values of any one or more of the fields 104a-ab shown in FIG. 1A.

Figure 4:
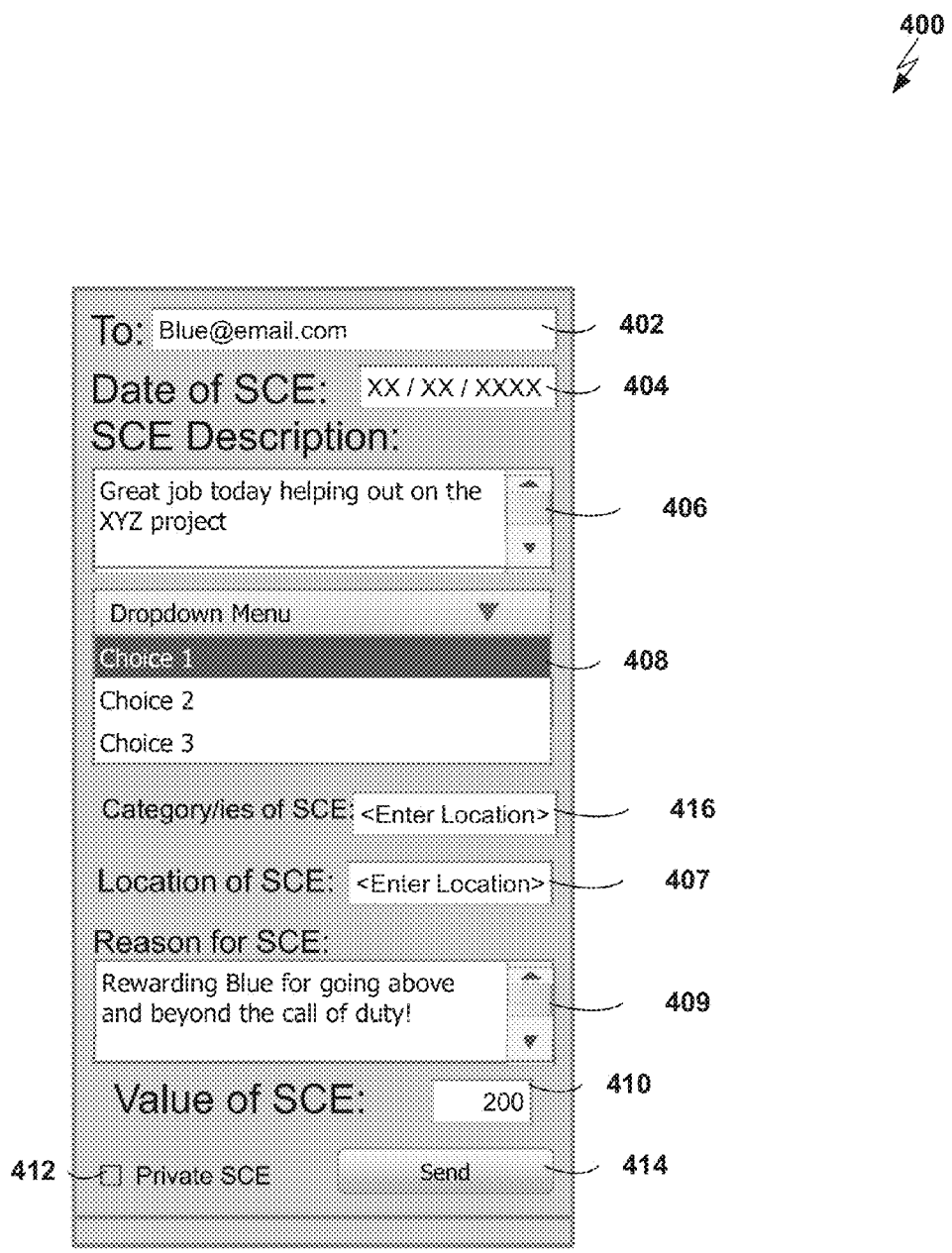
FIG. 4 illustrates a dialog box that is used by a sender of an SCE to provide input for creating an SCE according to one embodiment of the present invention.

For example, referring to FIG. 4, the computing device 205a may display to the sender 202 a dialog box 400 that the sender 202 may use to provide the SCE creation input 206. More specifically, in the example of FIG. 4, the dialog box 400 contains:

a "to" text field 402, into which the sender 202 may type or otherwise input an email address or other identifier of the intended recipient 204 of the SCE to be created (and for storage in the "to" field 104c of that SCE);

a "date" field 404, the contents of which may be filled automatically with the current date by the computing device 205a, and/or into which the sender 202 may type or otherwise input a date on which the event upon which the SCE is based (and for storage in the "event date" field 104aa of that SCE);

a "description" field 406, into which the sender 202 may type or otherwise input a human-readable description of the SCE to be created (and for storage in the "description" field 104i of that SCE);

a "description pick list" 408, from which the sender 202 may select a predetermined description, thereby causing the selected description to be copied into the "description" field 406 of that SCE;

a "categories" field 416, into which the sender 202 may provide input representing zero, one, or more categories of the SCE (for storage in the "category" field 104f of the SCE);

a "location" field 407, into which the sender 202 may type or otherwise input data representing a location of the event upon which the SCE is based (and for storage in the event location field 104z of that SCE);

a "reason" field 409, into which the sender 202 may type or otherwise input data representing a reason for creating the SCE (and for storage in the creation reason field 104n of that SCE);

a "value" field 410, into which the sender 202 may type or otherwise input a value, to the sender 202, of the SCE to be created (and for storage in the "from value" field 104b of that SCE); and a "private" field 412, which the sender 202 may check or uncheck to indicate whether the SCE to be create is private (and for storage in the "private" field 104h of that SCE).

Upon completing data entry into the dialog box 400, the sender 202 may click on the "Send" button or otherwise provide input indicating that the sender 202 has finished inputting the input 206. In response, the computing device 205a may provide the SCE creation input 206 to an SCE management module 210, such as by transmitting the input 206 to the module 210 over a network 208 (such as the public Internet or a private intranet) (FIG. 3, operation 304). The computing device 205a may include additional information in the SCE creation input 206 automatically (i.e., without requiring such information to be input by the sender 202), for inclusion in the SCE to be created. Examples of such information include an email address or other identifier of the sender 202 (for inclusion in the "from" field 104a) and a location of the sender 202, which may, for example, be obtained from a GPS module of the sender 202's computing device 205a (for inclusion in the creation location field 104l).

In response to receiving the SCE creation input 206, the module 210 may create a new SCE based on the input 206, such as by creating a new empty SCE and copying the field values input by the sender 202 into the corresponding fields in the newly-created SCE (FIG. 3, operation 306). The module 210 may store the newly-created SCE in an SCE store 212. Assume, for purposes of example, that the SCE created by the sender 202 according to FIG. 4 is stored as unit 214a in the store 212. As shown in FIG. 2, the store 212 includes SCEs 214b-n in addition to the unit 214a created by the sender 202 via FIG. 4. The store 212 may include any number of SCEs, created by any number and combination of users.

Although all of the SCEs 214a-n in the system 200 are shown as being stored in the SCE store 212 in FIG. 2, this is merely an example and does not constitute a limitation of the present invention. SCEs may, additionally or alternatively, be stored elsewhere in the system 200. For example, any particular SCE may be stored in the store 212, the sender's computing device 205a, and/or the recipient's computing device 205b. Any particular SCE may be stored in a single location, or replicated at multiple locations. For example, a particular SCE may be stored solely in the sender's computing device 205a. As another example, copies of a particular SCE may be stored in the sender's computing device 205a, the recipient's computing device 205b, and the store 212. Multiple "copies" of a particular SCE need not all contain the same information as each other. For example, a "master" copy of a particular SCE may be stored in the store 212, while additional copies, containing less than all of the information in the master copy, may be stored in the sender's computing device 205a, the recipient's computing device 205b, the computing device of another SCEAH, and/or the computing device of a user who is not an SCEAH. Those having ordinary skill in the art will understand how to store SCEs in these and other ways.

The system 200 may provide the recipient 204 with a notification 216 that the sender 202 has created an SCE (namely, SCE 214a) which designates recipient 204 as the recipient (FIG. 3, operation 308). The module 210 may, for example, transmit the notification 216 to the recipient 204's computing device 205b over the network 208. The module 210 may, for example, transmit the notification 216 to the recipient 204's computing device 205b automatically, in response to the creation of the SCE 214a. In response to receiving the notification 216, the recipient 204's computing device 205b may display the notification 216, or information derived therefrom, to the recipient 204. The notification 216 may take any of a variety of forms, such as a message transmitted to the recipient 204 (e.g., an email, text, voice, or video message), a pop-up window, or an alert displayed or otherwise manifested by a dedicated application executing on the recipient's computing device 205b.

Figure 5:
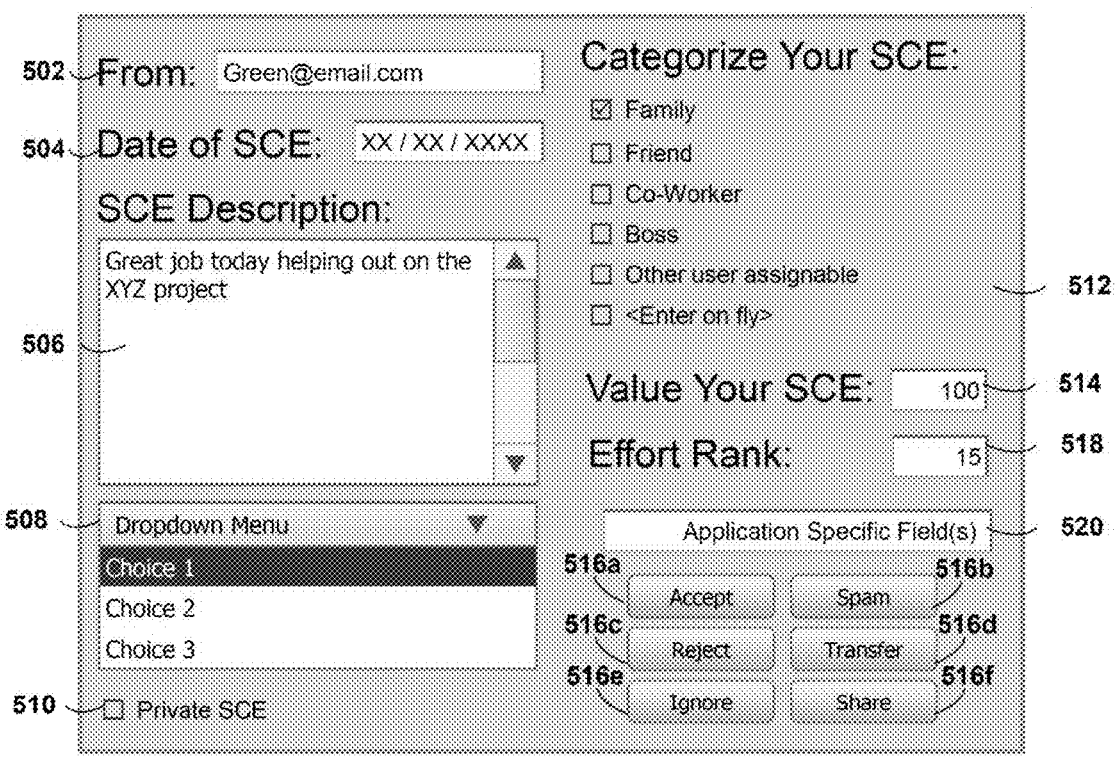
FIG. 5 illustrates a dialog box that is used to display a notification to a recipient of an SCE that the SCE has been send to the recipient according to one embodiment of the present invention.

An example of such a display of the notification 216 is shown in FIG. 5, which illustrates a dialog box 500 that the computing device 205b may use to display the notification 216 to the recipient 204 and to receive input from the recipient 204 in response. The dialog box 500 informs the recipient 204:
  that the sender 202 has sent the SCE 214a to the recipient 204 through the use of text 502, which includes the email address or other identifier of the sender 202;
  of the "event date" field 104aa of the SCE 214a via field 504;
  of the "description" field 104i of the SCE 214a via field 506;
  of the "category" field 104f of the SCE 214a via fields 508; and
  of the "private" field 104h of the SCE 214a via checkbox 510.

The module 210 may populate the contents of fields 502, 504, 506, 508, and 510 automatically from fields 104a, 104aa, 104i, 104f, and 104h, respectively, of the SCE 214a.

The dialog box 500 may also provide various mechanisms for the recipient 204 to provide input containing data that may be used by the system 200 to supplement and/or modify the contents of the SCE 214a (FIG. 3, operation 310). For example, the recipient 204 may provide input into category fields 512 to specify one or more categories to associate with the SCE 214a, in addition to any categories already assigned to the SCE 214a by the sender 202 (e.g., via category field 416 in the dialog box 400). As FIGS. 4 and 5 imply, both the sender 202 and recipient 204 may assign categories to the SCE 214a. As a result, the value(s) stored in the category field 104f of the SCE 214a may include value(s) provided by the sender 202, values provided by the recipient 204, or a combination of both the sender 202 and recipient 204.

As another example, the dialog box 500 may include a field 514 into which the recipient 204 may type or otherwise input a perceived value of the SCE 214a to the recipient 204. The recipient 204 may select button 516a or otherwise provide input indicating that the recipient 204 accepts the SCE 214a from the sender 202, in response to which the recipient 204's computing device 205b may provide response input 218 to the module 210, such as by transmitting the input 218 to the module 210 over the network 208 (FIG. 3, operation 312). The input 218 may, for example, include the data input by the recipient 204 into fields 512 and 514, and data indicating that the recipient 204 has accepted the SCE 214a. In response to receiving the input 218 (FIG. 3, operation 314), the module 210 may update the SCE 214a to contain data representing the contents of fields 512 and 514 (such as by storing the category data from fields 512 into the category field 104f of the SCE 214a and storing the recipient value data from field 514 into the "to value" field 104d of the SCE 214a), and update the SCE 214a to store data indicating that the recipient 204 has accepted the SCE 214a (FIG. 3, operation 316).

As the dialog boxes 400 and 500 of FIGS. 4 and 5, respectively, make clear, the sender 202 of the SCE 214a may assign a different value to the SCE 214a than the recipient 204 of the same SCE 214a. In contrast, traditional assets (e.g., an orange, a car, a house, or a share of stock) are traditionally given a definitive value in terms of an accepted monetary unit (e.g., U.S. Dollars, EU Euros, or British Pounds Sterling), based on a purchase and sale transaction, whereby a willing buyer and a willing seller (i.e., transacting parties) agree upon a defined number of monetary units to enable a sale to take place (i.e., a "meeting of the minds"). This definitive value can be, but need not be, influenced in whole or in part by external price signals. For example, in the case of a stock purchase and sale, the stock price may be influenced by the bid, the ask, the trading volume, analyst reports, and financial forecasts. Like a traditional asset, an SCE may initially be given a definitive unit value. However, since in the case of an SCE there is a creation and acceptance transaction rather than a purchase and sale transaction, there need not be a "meeting of the minds" in connection with the initial value of an SCE. As a result, in comparison to the single shared value ascribed to a traditional asset by transacting parties following a transaction, an SCE may have multiple differing unit values assigned to it by the transacting parties, as evidenced by the sender 202's "Value of SCE" field 410 and corresponding "From Value" field 104b, and the recipient 204's "Value of SCE" 514 and corresponding "To Value" field 104d.

The dialog box 500 also includes effort rank field 518, into which the recipient 204 may type or otherwise input data representing a level of effort that was required to complete the event upon which the SCE 214a is based. The value provided by the recipient 204 may be stored in the effort rank field 104ab (FIG. 1A) of the SCE 214a. Although FIG. 5 only shows a single effort rank field 518 for completion by the recipient 204, in practice the effort rank field 104ab of the SCE 214a may store data representing effort ranks provided by any number of senders and/or recipients of the SCE 214a.

The recipient 204 may take actions other than accepting the positive social current unit in response to receiving notification of the SCE 214a. As a result, the response input 218 may indicate actions by the recipient 204 other than acceptance of the SCE 214a. For example, as shown in FIG. 5, the recipient 204 may select any of buttons 516b-d as follows:

Spam button 516b. The recipient 204 may select the "spam" button 516b to indicate that the recipient 204 considers the SCE 214a to be spam, in response to which the module 210 may store an indication that the recipient 204 considers the SCE 214a to be spam, and take any action conventionally taken in connection with spam (such as preventing the sender 202 from sending additional social currency events to the recipient 204 and/or to other recipients in the system 200).

Reject button 516c. The recipient 204 may select the "reject" button 516c to indicate that the recipient 204 rejects the SCE 214a, in response to which the module 210 may store an indication that the recipient 204 has rejected the SCE 214a, as a result of which the SCE 214a may be excluded from reporting, calculations, and other actions in connection with the recipient 204 (possibly by removing the recipient 204's identifier from the "to" field 104c of the SCE 214a). The module 210 may notify the sender 202 that the recipient 204 has rejected the SCE 214a.

Transfer button 516d. The recipient 204 may select the "transfer" button 516d to indicate that the recipient 204 wishes to transfer the recipient status of the SCE 214a to another user. For example, the recipient 204 may select the transfer button 516d and provide input representing an identifier (e.g., username or email address) of another user, in response to which the module 210 may change the value of the "to" field 104c of the SCE 214a to indicate the identifier of the other user. A user to whom the SCE 214a is transferred is an example of a "third party" to the SCE 214a, as that term is used herein.

Ignore button 516e. The recipient 204 may select the "ignore" button 516e, which may cause the module 210 to take similar actions as those taken in response to the "reject" button 516c, except that the module 210 may not notify the sender 202 that the recipient 204 has ignored the SCE 214a.

Share button 516f. The recipient 204 may select the "share" button 516f and provide input representing an identifier of another user, which may cause the module 210 to take similar actions as those taken in response to the "transfer" button 516d, except that the module 210 may add the specified other user as an owner of the SCE 214a, while keeping the original recipient 204 as an additional owner. As a result of such sharing, the SCE 214a will have two owners, including both the original recipient 204 and the other user specified by the recipient 204. The recipient 204 may also provide an ownership percentage in association with the other user, in response to which the module 210 may add the other user as a recipient of the SCE 214a with the specified ownership percentage, and assign the remaining ownership percentage to the original recipient 204. Similar techniques may be applied if the recipient 204 provides input instructing the module 210 to share the SCE 214a with multiple other users. A user with whom the SCE 214a is shared is an example of a "third party" to the SCE 214a, as that term is used herein.

Figure 6:
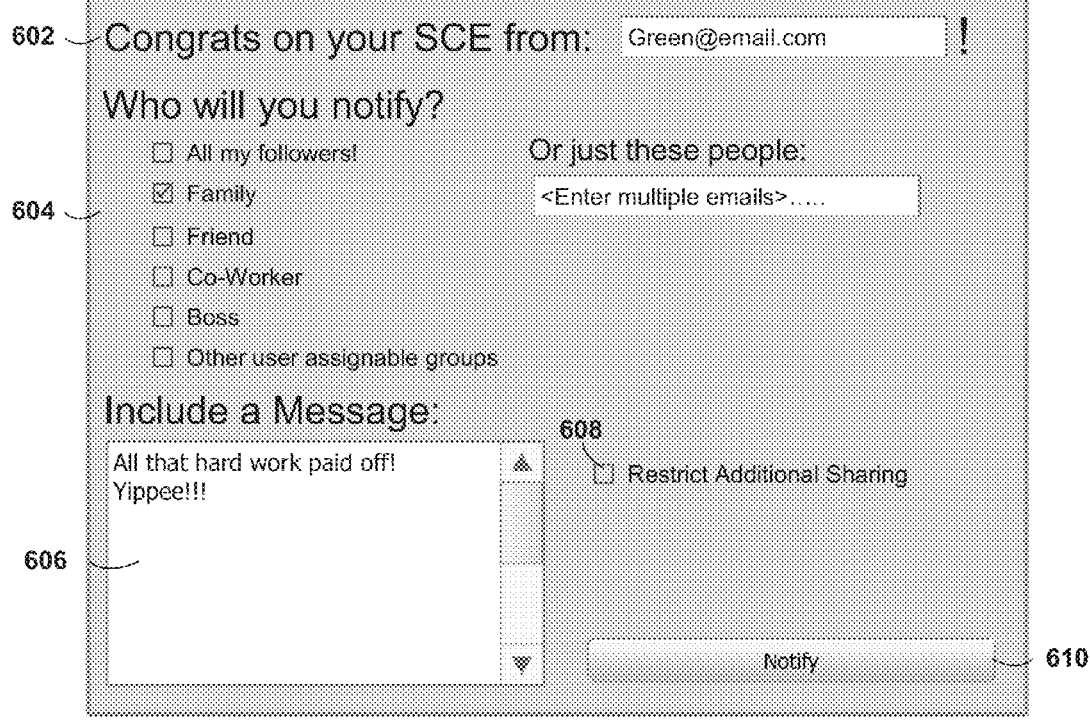
FIG. 6 illustrates a dialog box that is used to receive input from a recipient of an SCE in response to receipt of a notification of the SCE according to one embodiment of the present invention.

The dialog box 500 may also include one or more application-specific fields 520. The application-specific fields 520 are shown as a single text box in FIG. 5, but may take any form. Any input provided by the recipient 204 into the application-specific fields 520 may be provided to the module 210, which may in turn provide such input to an external software application. In addition, the module 210 may store such input internally, e.g., in the SCE 214a. As mentioned above, the creator (e.g., sender 202) of the SCE 214a may be a computer program or computing device. In such cases, the module 210 may provide the contents of some or all of the fields of the SCE 214a, such as the application-specific fields 520, to the program/device which created the SCE 214a. Upon the recipient 204's acceptance of the SCE 214a, the system 200 may provide the recipient 204 with an opportunity to notify others that the SCE 214a has been created and sent to the recipient 204. An example of such a display of the notification 216 is shown in FIG. 6, which illustrates a dialog box 600 that the computing device 205b may use to display the notification 216 to the recipient 204 and to receive input from the recipient 204 in response. The dialog box 600 reminds the recipient 204 that the sender 202 has sent the SCE 214a to the recipient 204 through the use of text 602, which includes the email address or other identifier of the sender 202. The dialog box 600 also includes various fields 604 for enabling the recipient 204 to provide input specifying one or more people whom the recipient 204 wishes to notify of the SCE 214a. The dialog box 600 also includes a text field 606 into which the recipient 204 may type a human-readable text message to be provided to the people specified in fields 604. The dialog box 600 also includes a checkbox 608 which the recipient 204 may check to indicate that the people specified in fields 604 should not be allowed to notify others of the SCE 214a.

If the recipient 204 wishes to notify others of the SCE 214a, the recipient 204 may provide input into some or all of the fields 604, 606, and 608, and then select a "Notify" button 610 or otherwise provide input indicating a desire to notify others of the SCE 214a. In response to receiving such input 220 from the recipient 204, the recipient 204's computing device 205b may provide such input 218 to the module 210, such as by transmitting the input 220 to the module 210 over the network 208. In response to receiving the input 220, the module 210 may perform one or more of the following:

provide notifications of the SCE 214a to the person or people specified by the recipient 204 via the dialog box 500;
provide notifications of the SCE 214a to the sender 202 of the SCE;
notify one or more applications (e.g., client applications) associated with the SCE 214a; and
update a Facebook page, other social network account, or other applications of the sender 202 and/or recipient 204 with a notification of the SCE 214a.

Figure 7:
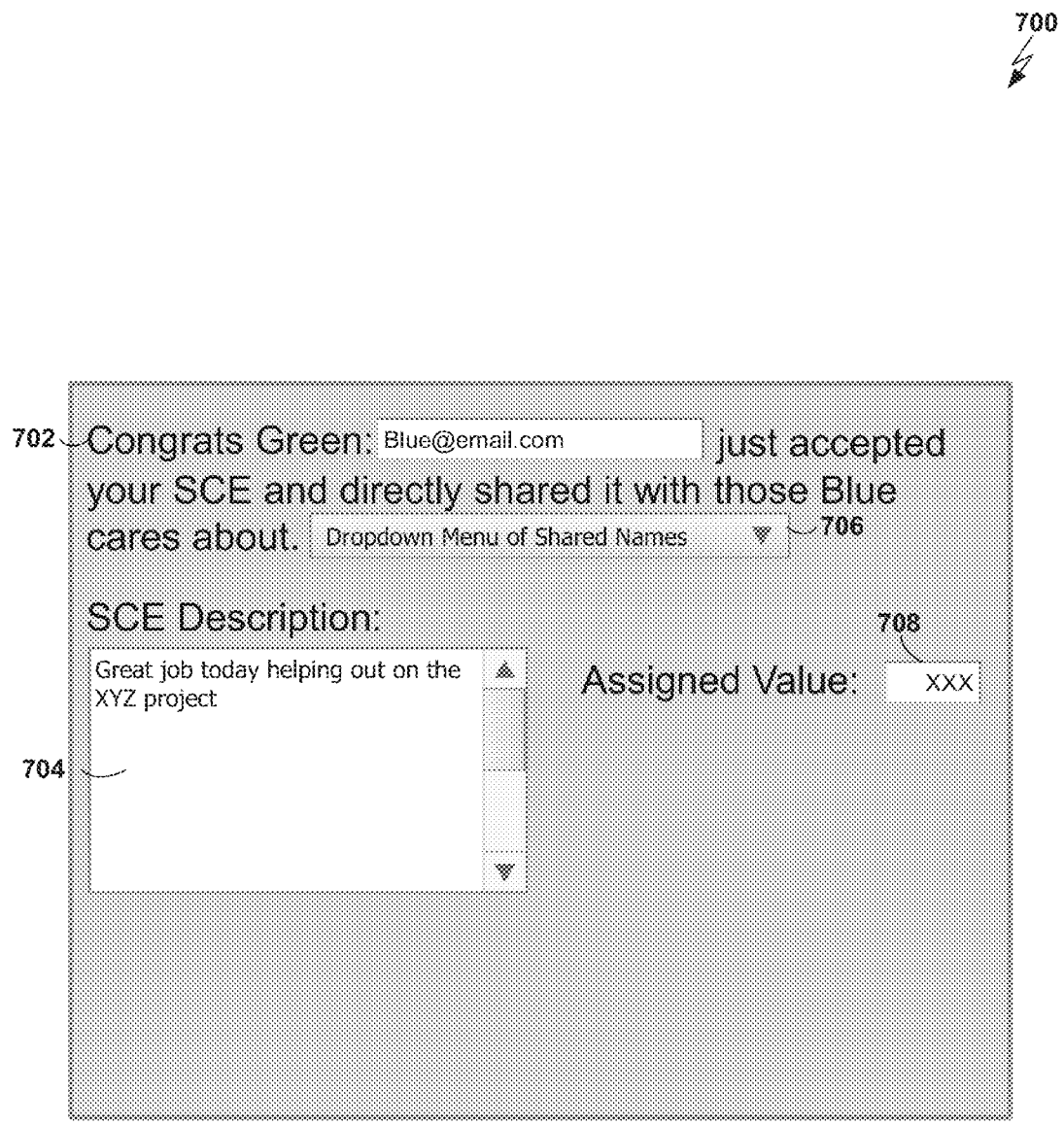
FIG. 7 illustrates a dialog box that is used to notify a sender of an SCE that a recipient of the SCE has accepted the SCE according to one embodiment of the present invention.

Upon, and automatically in response to, the recipient 204's acceptance of the SCE 214a, the system 200 may also provide the sender 202 with a notification 222 that the recipient 204 has accepted the SCE 214a. For example, the module 210 may transmit the notification 222 to the sender 202's computing device 205a over the network 208. In response to receiving the notification 222, the sender 202's computing device 205a may display the notification 222 to the sender 202. An example of such a display of the notification 222 is shown in FIG. 7, which illustrates a dialog box 700 that the computing device 205a may use to display the notification 222 to the recipient 204. The dialog box 700 notifies the sender 202 that the recipient 204 has accepted the SCE 214*a* sent by the sender 202 through the use of text 702, which includes the email address or other identifier of the recipient 204. The dialog box 700 also includes field 704, which reminds the sender 202 of the description provided by the sender 202 of the SCE 214*a*. The dialog box 700 also contains a list 706 of the people who the recipient 204 notified of the SCE 214*a*. The dialog box 700 also displays to the sender 202 the value 708 assigned by the recipient 204 to the SCE 214*a*. As the examples in FIGS. 5 and 7 demonstrate, the value assigned by the sender 202 to the SCE 214*a* may differ from the value assigned by the recipient 204 to the same SCE 214*a*.

Figure 8:
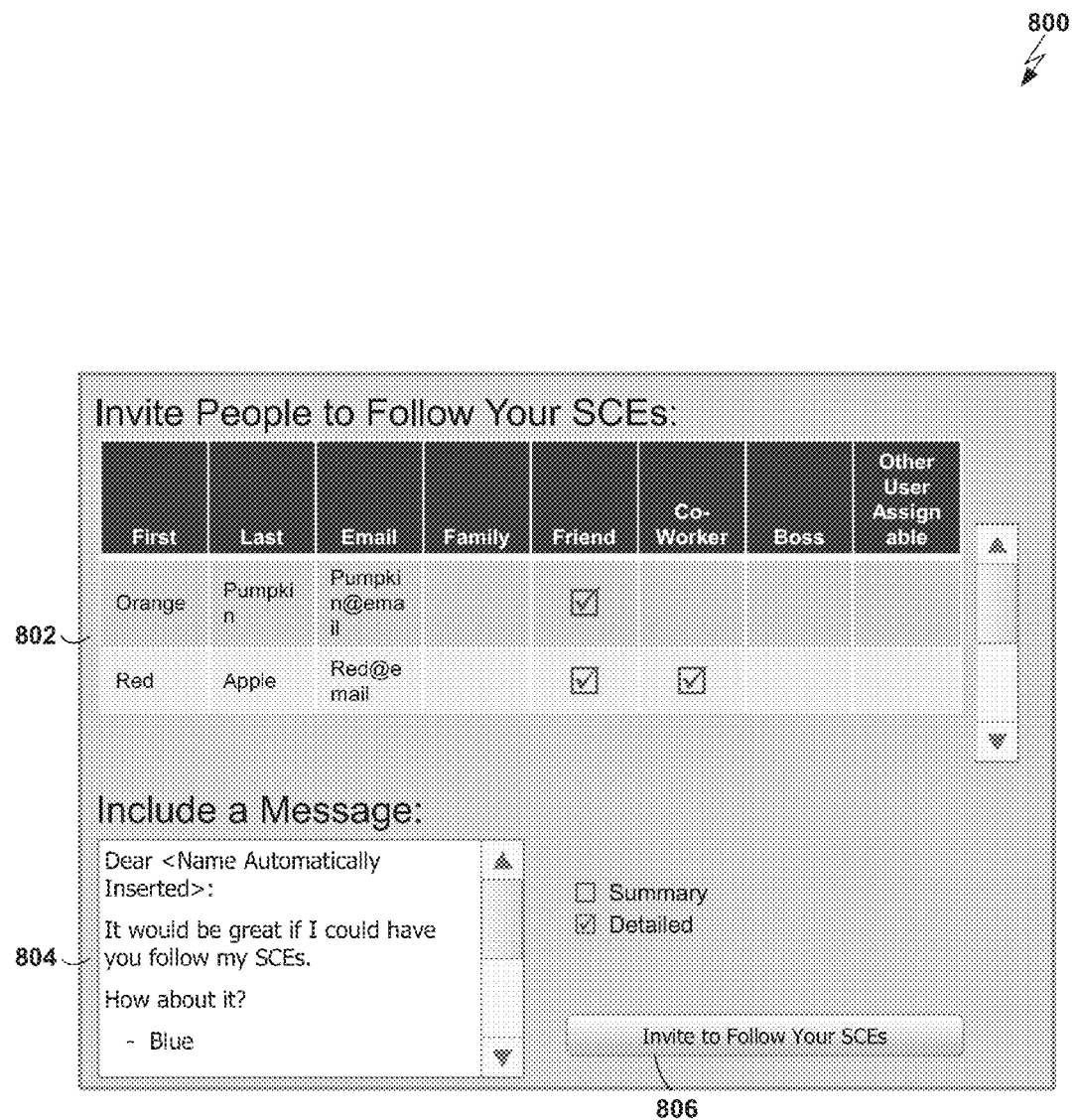
FIG. 8 illustrates a dialog box that is used to enable a recipient of an SCE to invite one or more people to follow the recipient's SCEs according to one embodiment of the present invention.

The system 200 may provide the recipient 204 with a mechanism for enabling other users of the system 200 to "follow" any social currency events received by the recipient 204 (such as SCE 214*a*). Referring to FIG. 8, an example is shown of a dialog box 800 that the system 200 may display to the recipient 204 to enable the recipient 204 to invite one or more people to follow the recipient 204's SCEs. In its most basic form, the dialog box 800 provides a means for the recipient 204 to provide the identities of one or more invitees, such as fields 802, into which the recipient 204 may provide information for each such invitee, such as a real name, email address or other online identifier, and category designation(s). The dialog box 800 also includes a field 804 into which a message template may be automatically inserted by the module 210, and which the recipient 204 may edit manually. Once the recipient 204 has finished providing input into the dialog box 800, the recipient 204 may select an invite button 806 or otherwise provide input indicating that input into the dialog box 800 is complete. The recipient 204's computing device 205*b* may provide invitation input 224 (representing the information provided by the recipient 204 in the dialog box 800) to the module 210, such as by transmitting the input 224 to the module over the network 208.

In response to receiving the invitation input 224, the module 210 may provide one or more invitations 226 to the invitee(s) 228 specified by the recipient 204, such as by transmitting the invitations 226 to the invitees 228 over the network 208. In response, each of the invitees 228 may provide a response indicating whether the invitee accepts or rejects the corresponding invitation. The module 210 may receive the responses and update the SCE 214*a* accordingly to contain data indicating which of the invitees 228 accepted their respective invitations. Once this list of followers has been stored in the SCE 214*a* (e.g., in the followers field 104*r*) and in the SCEAH record of the recipient 204 (e.g., in the followers field 154*g*), the module 210 may automatically notify the invitees 228 of any changes to data in the store 212 relating to the recipient 204, such as the creation of new SCEs for which the recipient 204 is a recipient and/or sender, and the modification of any data to such SCEs.

Conversely, a user of the system 200 may request to become a follower of another SCEAH within the system 200. For example, an SCEAH may request to become a follower of the recipient 204. FIG. 9 shows an example of a dialog box 900 that may be used to receive input from an SCEAH for generating a request by the SCEAH to become a follower of another SCEAH. Those having ordinary skill in the art will appreciate how the system 200 may use the dialog box 900 to enable one SCEAH to become a follower of another SCEAH.

Figure 10:
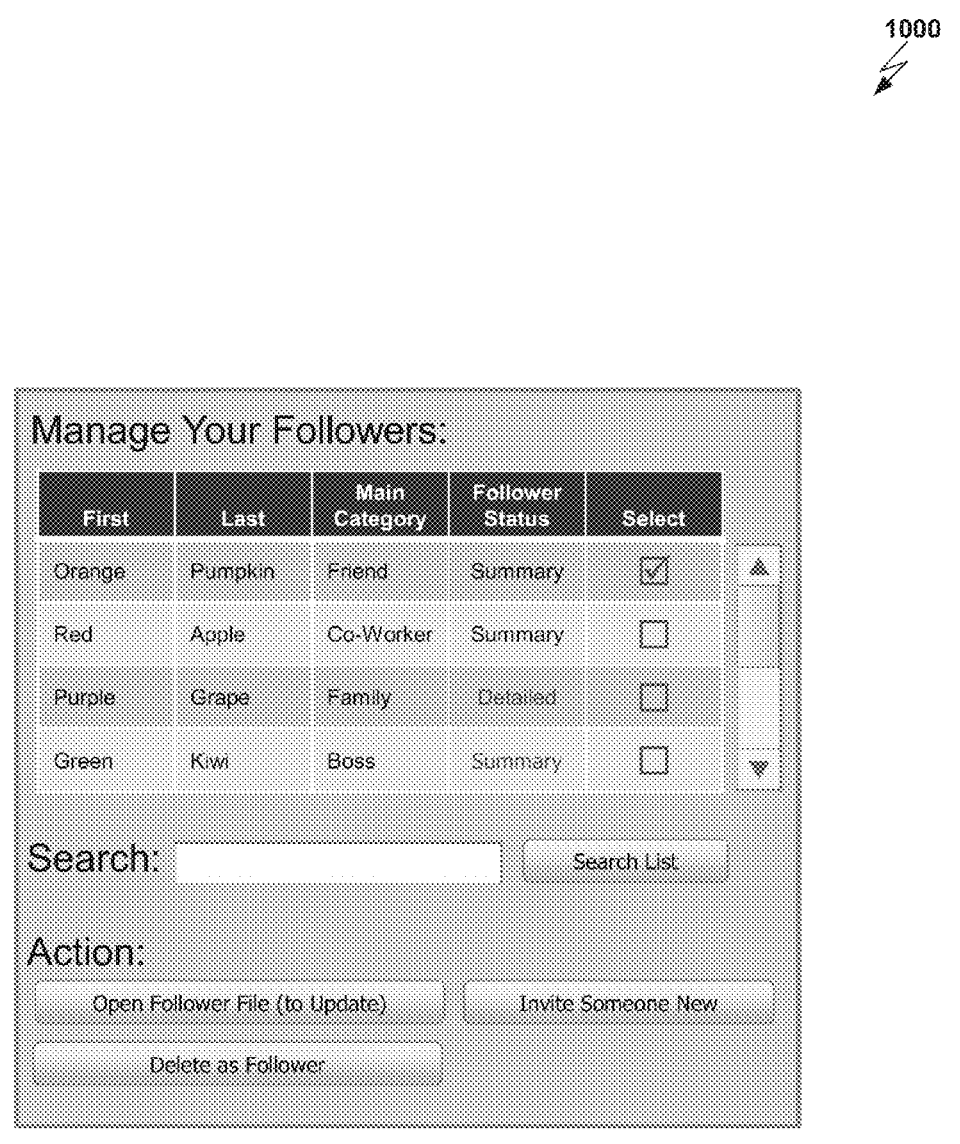

An SCEAH of the system 200 who has followers may use the system 200 to manage such followers in a variety of ways, such as viewing followers, deleting followers, and inviting new followers. FIG. 10 shows an example of a dialog box 1000 that may be used to display information to an SCEAH about that SCEAH's followers and to receive input from the SCEAH to manage the SCEAH's followers. Those having ordinary skill in the art will appreciate how the system 200 may use the dialog box 1000 to enable one user to manage that SCEAH's followers.

Conversely, an SCEAH who is following other SCEAHs may use the system 200 to manage the SCEAHs who that SCEAH is following in a variety of ways, such as viewing people being followed, deleting people being followed, and requesting to become a follower of someone new. FIG. 11 shows an example of a dialog box 1100 that may be used to display information to an SCEAH about who that SCEAH is following and to receive input from the SCEAH to manage the SCEAHs who the SCEAH is following. Those having ordinary skill in the art will appreciate how the system 200 may use the dialog box 1000 to enable one SCEAH to manage the SCEAHs who that SCEAH is following.

In the examples described above, a SCE is associated with two SCEAHs, such as a sender and a recipient. This is not a requirement of the present invention. As another example, a SCE may be associated with only a single SCEAH, such as the creator (e.g., sender) of the SCE. The purpose of such an SCE may, for example, be for the SCE's creator to praise himself or herself, such as for achieving a personal goal.

An SCEAH may create such a self-directed SCE in a manner that is similar to the techniques described above for creating a two-SCEAH SCE. Therefore, for ease of explanation and illustration, certain techniques for creating a self-directed SCE will be described in connection with FIGS. 2 and 3. In such descriptions, it should be understood that the "sender" 202 shown in FIG. 2 represents the creator of the SCE, and that the "recipient" 204 shown in FIG. 2 is the same SCEAH as the sender 202. Therefore, in any description herein of self-directed social currency events, any references to the "sender" and/or "recipient" of such social currency events should be understood to refer to the creators of such social currency events.

To create a self-directed SCE (i.e., an SCE having at least one sender who is the same as at least one recipient of the SCE), the sender 202 may provide SCE creation input 206 to the first computing device 205*a* in any of the ways described above with respect to FIGS. 2 and 3, except that input relating to the "to" field 104*c* and "to value" field 104*d* may be omitted.

Figure 12:
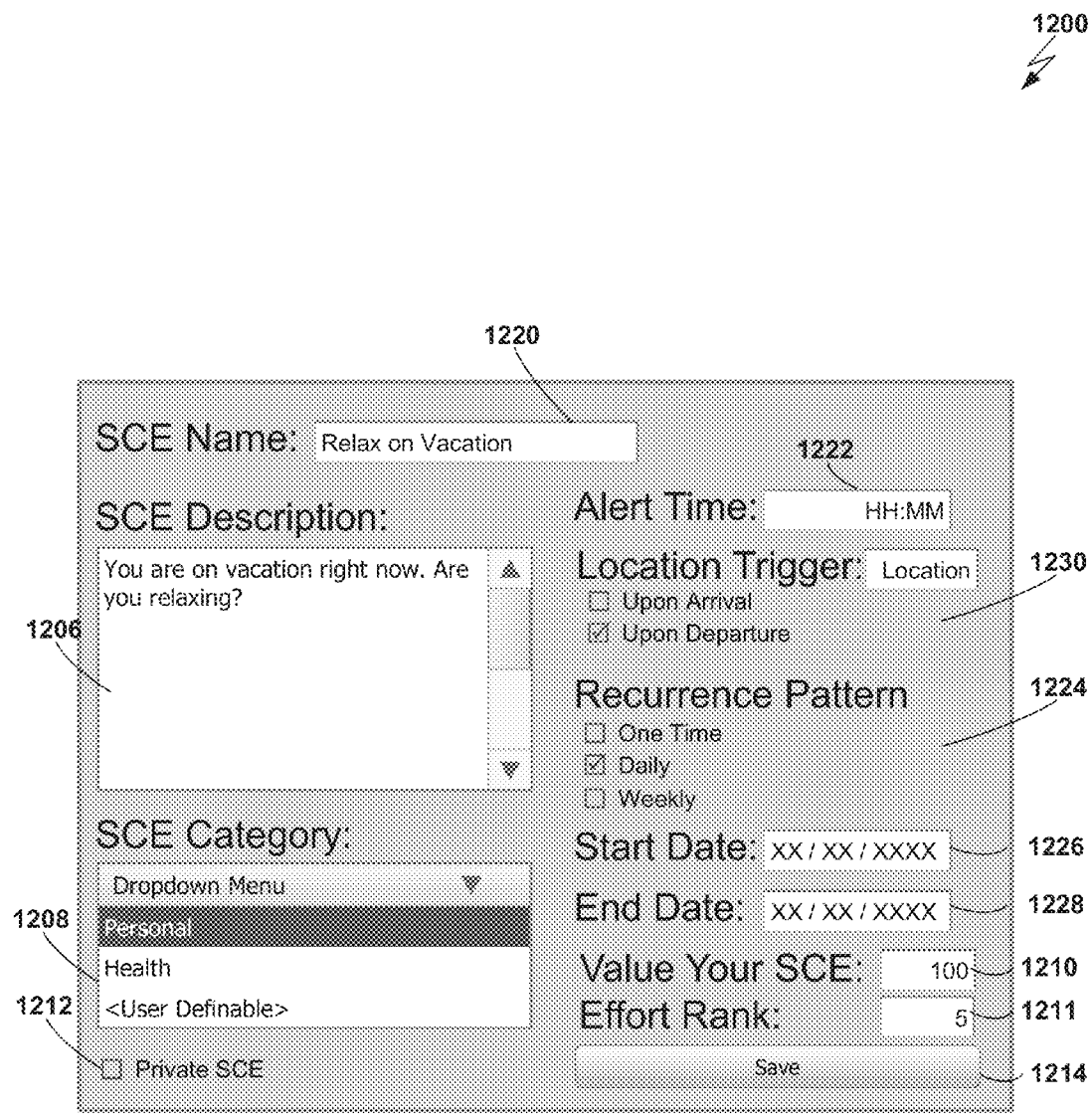
FIG. 12 illustrates a dialog box that is used to provide SCE creation input for creating an automatically-triggered self-directed SCE according to one embodiment of the present invention.

Referring to FIG. 12, the computing device 205*a* may display to the sender 202 a dialog box 1200 that the sender 202 may use to provide the SCE creation input 206. The dialog box 1200 of FIG. 12 is similar to the dialog box 400 of FIG. 4. For example, the dialog box 1200 contains:

"description" field 1206, which performs a function similar to that of "description" field 406 in FIG. 4;

"category" field 1208;

"value" field 1210, which performs a function similar to that of "value" field 410 in FIG. 4;

"effort rank" field 1211, which performs a function similar to that of "effort rank" field 518 in FIG. 5;

"private" field 1212, which performs a function similar to that of "private" field 412 in FIG. 4; and save button 1214, which performs a function similar to that of send button 414 in FIG. 4.

The dialog box 1200 in FIG. 12 also includes a "name" field 1220, into which the sender 202 may type or otherwise input a name of the SCE being created.

In response to the sender 202 selecting the save button 1214 or otherwise providing input indicating that the sender 202 desires to create a self-directed SCE in accordance with the data in the dialog box 1200, the system 200 may create an SCE based on the data shown in FIG. 12. Assume for purposes of example that this is shown as SCE 214*b* in FIG. 2. Such a self-directed SCE may be represented and stored using the same data structure format as that shown in FIG. 1, except that certain fields (e.g., the "from" field 104*a* and from value 104*b*) may be left empty. The system 200 may automatically store the email address or other identifier of the creator 202 of the self-directed SCE 214*b* in the "to" field 104*c* of the SCE 214*b*, thereby eliminating the need for the creator 202 to enter such information manually into the dialog box 1200.

Since the sender and recipient of a self-directed SCE are the same person, there is no need for the system 200 to generate and transmit the creation notification 216 to the recipient/sender upon creation of a self-directed SCE. It may still be useful, however, for the system 200 to notify the sender/creator 202 of such a SCE at one or more times. For example, a self-directed SCE may be designed to remind the creator 202 of the goal or other information represented by a self-directed SCE once or repeatedly (e.g., periodically or in accordance with some other schedule, rule, or algorithm). For example, assume that the sender 202 has set a goal of relaxing every day on his vacation. In such a case, the sender 202 may specify, via alert time field 1222, a time at which the system 200 is to alert the sender 202 of the goal represented by the SCE 214*b*. The sender 202 may also specify, via location trigger fields 1230, whether to alert the sender 202 of the SCE 214*b* upon arrival at a specified location, upon departure from the specified location, or both. The sender 202 may also specify, via recurrence pattern fields 1224, whether to alert the sender 202 of the SCE 214*b* daily, weekly, monthly, yearly, or a combination thereof. The sender 202 may also specify, via start date field 1226 and end date field 1228, a start date and end date of the alert recurrence.

The system 200 may automatically notify (alert) the creator 202 of the SCE 214*b* created via dialog box 1200 at the time specified by alert time field 1222, according to the recurrence pattern specified by recurrence pattern fields 1224, but only within the date range specified by the start and end date fields 1226 and 1228. For example, each time the alert time specified by alert time field 1222 occurs within the date range specified by the start and end date fields 1226 and 1228, the system 200 may display to the creator 202 a dialog box 1300 of the kind shown in FIG. 13. The dialog box 1300 is similar to the dialog box 400 of FIG. 4, in that it contains "to" field 1302, "date" field 1304, "description" field 1306, "value" field 1310, and "private" field 1312, which are similar to fields 402, 404, 406, 410, and 412, respectively in FIG. 4. The system 200 may fill the initial value of "value" field 1310 with the value entered by the creator 202 in "value" field 1210 of the dialog box 1200 in FIG. 12.

Figure 13:
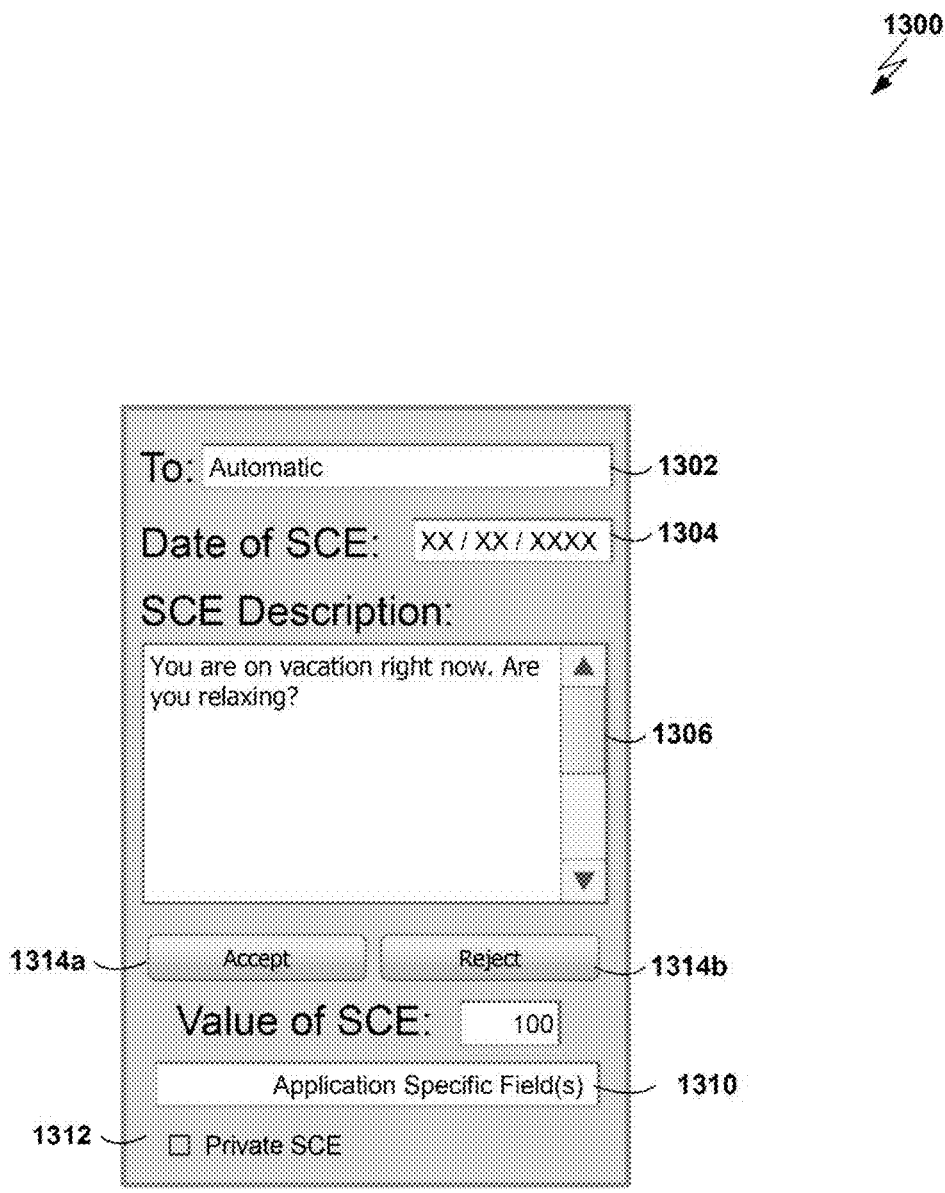
FIG. 13 illustrates a dialog box that is used by an SCEAH to accept the creation of an automatically-generated self-directed SCE according to one embodiment of the present invention.

The dialog box 1300 of FIG. 13 contains "Accept" and "Reject" buttons 1314*a* and 1314*b*, respectively, in place of the "Send" button 414 of FIG. 4. If the creator 202 agrees with the truth of the statement in the description field 1306 or otherwise wishes to accept the creation of a new self-directed SCE in accordance with the data shown in the dialog box 1300, then the creator 202 may select the "Accept" button 1314*a* (and optionally edit the value of the value field 1310). Otherwise, the creator 202 may select the "Reject" button.

If the creator 202 selects the "Accept" button 1314*a*, then the system 200 creates and stores a self-directed SCE in accordance with the data shown in the dialog box 1300. Otherwise, the system 200 does not create such a self-directed SCE. Since the system 200 may display the dialog box 1300 repeatedly over time in accordance with the recurrence pattern specified in the dialog box 1200 of FIG. 12, the creator 202 may create multiple self-directed SCEs in accordance with the data shown in the dialog box 1300 by selecting the "Accept" button 1314*a* each time the dialog box 1300 is displayed.

An SCEAH who has created self-directed SCEs may use the system 200 to manage such SCEs in a variety of ways, such as viewing, deleting, and creating new self-directed SCEs. FIG. 14 shows an example of a dialog box 1400 that may be used to display information to a SCEAH about that SCEAH's self-directed SCEs and to receive input from the SCEAH to manage the SCEAH's self-directed SCEs. Those having ordinary skill in the art will appreciate how the system 200 may use the dialog box 1400 to enable one SCEAH to manage that SCEAH's self-directed SCEs.

SCEAHs may use the system 200 to create multi-SCEAH SCEs that are generated automatically based on a template in a manner similar to that described above for self-directed SCEs in connection with FIG. 12. An example of a dialog box 1600 for creating such a conditional multi-SCEAH SCE is shown in FIG. 16. The primary difference between the dialog box 1600 of FIG. 16 and the dialog box 1200 of FIG. 12 is that the dialog box 1600 of FIG. 16 includes a "to" field 1602 in which the sender 202 may type or otherwise input identifiers of one or more recipients. Once such recipients have been specified, the system 200 may use the dialog box 1600 to generate two-SCEAH SCEs in substantially the same manner as that described above in connection with FIG. 12 for self-directed SCEs.

An SCEAH may use the system 200 to manage all SCEs that have been created and/or received by the SCEAH in a variety of ways, such as viewing, deleting, and creating such SCEs. FIG. 15 shows an example of a dialog box 1500 that may be used to display information to an SCEAH about SCEs that the SCEAH has created and/or received. Those having ordinary skill in the art will appreciate how the system 200 may use the dialog box 1500 to enable one SCEAH to manage SCEs that the SCEAH has created and/or received.

Figure 17:
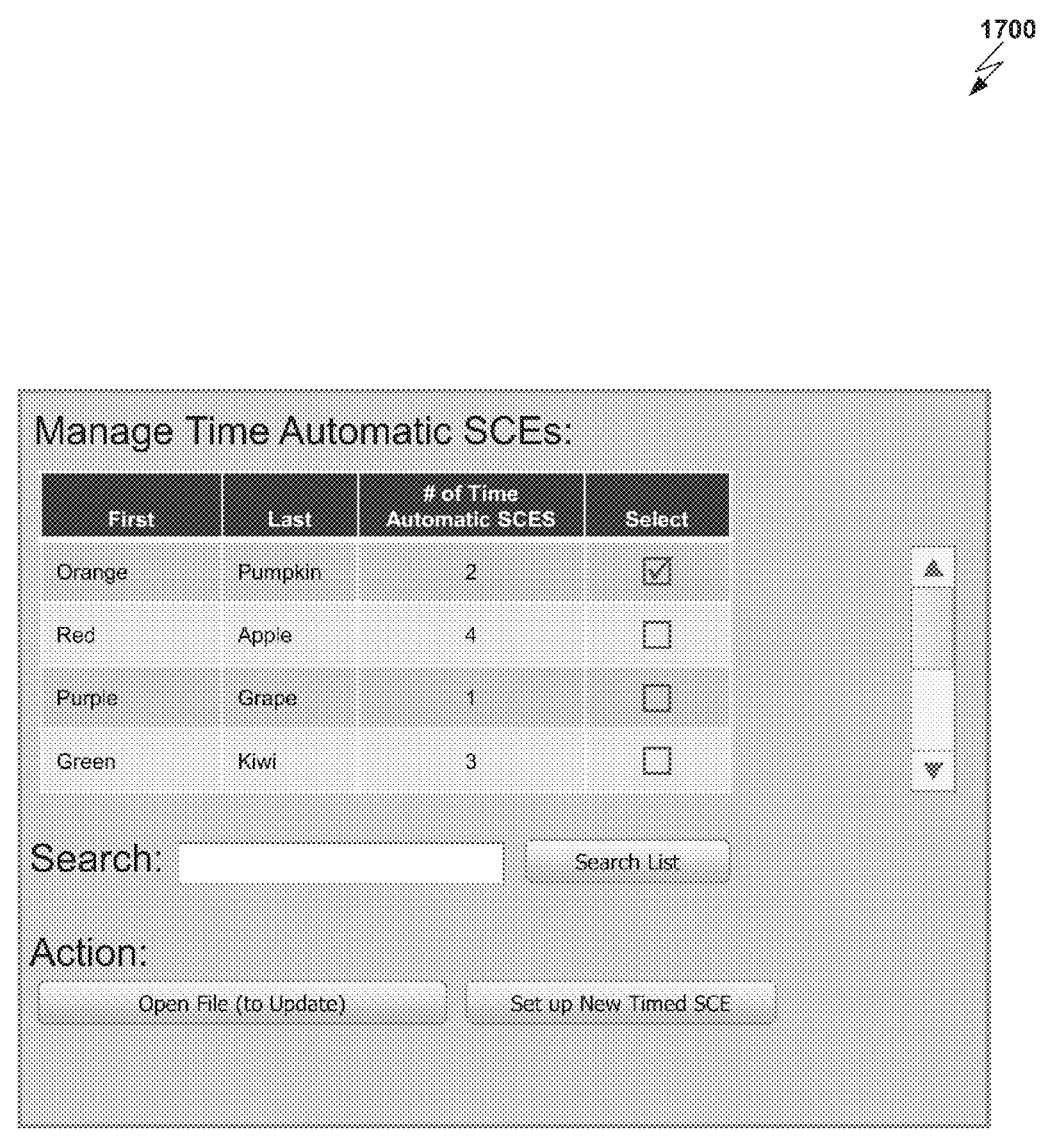

Similarly, a SCEAH may use the system 200 to manage all recurring SCEs that have been created by the SCEAH in a variety of ways, such as viewing, deleting, and creating such SCEs. FIG. 17 shows an example of a dialog box 1700 that may be used to display information to an SCEAH about recurring SCEs that the SCEAH has created. Those having ordinary skill in the art will appreciate how the system 200 may use the dialog box 1700 to enable one SCEAH to manage SCEs that the SCEAH has created and/or received.

Any of the lists described herein (such as the lists shown in FIGS. 8, 9, 10, 11, 14, 15, and 17) may be sorted and/or filtered in any of a variety of ways, such as according to any field or combination of fields. Such lists may include columns (fields) in addition to those shown herein and/or may omit columns (fields) shown herein.

Embodiments of the present invention may generate and display any of a variety of reports and other visual representations of SCEs stored in the store 212. Such visual representations may, for example, include visual representations of individual SCEs and/or visual representations of information that has been generated based on a plurality of SCEs. For example, referring to FIGS. 18A-18C, various examples of such visual representations are shown.

Figure 18A:
FIGS. 18A-18C illustrate various visual representations of information that has been generated based on a plurality of SCEs according to one embodiment of the present invention.

The visual representation 1800 shown in FIG. 18A includes visual representations 1802*a-c* of three SCEs. In FIG. 18A, the size of each of the representations 1802*a-c* is proportional to or otherwise a function of the value assigned to the corresponding SCE. In the particular example of FIG. 18A, the SCE corresponding to representation 1802*a* has the lowest value of the three depicted SCEs (as indicated by its relatively small size), the SCE corresponding to representation 1802*b* has the next-lowest value of the three depicted SCEs (as indicated by the fact that its size is only larger than representation 1802*a*), and the SCE corresponding to representation 1802*c* has the highest value of the three depicted SCEs (as indicated by the fact that it is larger than any of the other representations 1802*a-b*).

The visual representation 1800 shown in FIG. 18A may be used to depict the relative values of any of a variety of values, such as:
- the "to value" field 104*d* (FIG. 1A) of self-directed SCEs;
- the "to value" field 104*d* of two-SCEAH SCEs; and
- the "from value" field 104*b* of two-SCEAH SCEs.

Figure 18B:
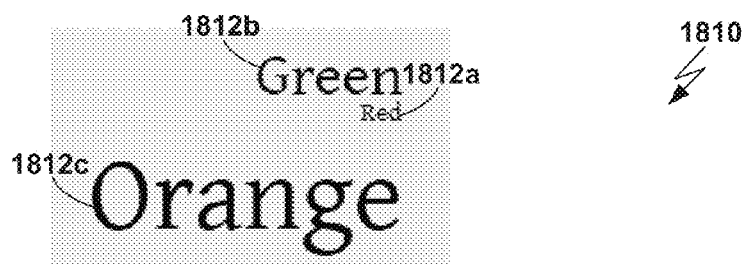

The visual representation 1810 shown in FIG. 18B includes visual representations 1812*a-c* of three SCEAHs of the system 200. In FIG. 18B, the size of each of the representations 1812*a-c* is proportional to or otherwise a function of the number of SCEs associated with the corresponding SCEAH. In the particular example of FIG. 18B, the SCEAH corresponding to representation 1812*a* is associated with the lowest number of SCEs (as indicated by its relatively small size), the SCEAH corresponding to representation 1812*b* is associated with the next-lowest number of SCEs (as indicated by the fact that its size is only larger than representation 1812*a*), and the SCEAH corresponding to representation 1812*c* is associated with the highest number of SCEs (as indicated by the fact that it is larger than any of the other representations 1812*a-b*).

The visual representation 1810 shown in FIG. 18B may be used to depict the relative numbers of any of a variety of SCEs, such as:
- the number of SCEs received from each of the depicted SCEAHs;
- the number of SCEs sent by each of the depicted SCEAHs;
- for each of the depicted SCEAHs, the total value assigned by recipients of all SCEs sent by that depicted SCEAH; and
- for each of the depicted SCEAHs, the total value assigned by that SCEAH to all SCEs sent by that SCEAHs.

Figure 18C:
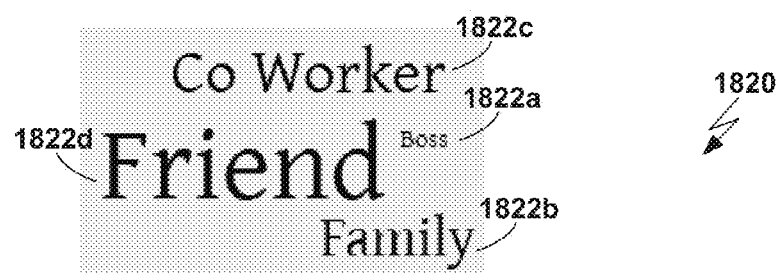

The visual representation 1820 shown in FIG. 18C includes visual representations 1822*a-d* of three categories of SCEs in the system 200. In FIG. 18C, the size of each of the representations 1822*a-d* is proportional to or otherwise a function of the number of SCEs associated with that category. In the particular example of FIG. 18C, the category corresponding to representation 1822*a* is associated with the lowest number of SCEs (as indicated by its relatively small size), the category corresponding to representation 1822*b* is associated with the next-lowest number of SCEs (as indicated by the fact that its size is only larger than representation 1822*a*), the category corresponding to representation 1822*c* is associated with the next-lowest number of SCEs (as indicated by the fact that its size is only larger than representations 1822*a* and 1822*b*) and the category corresponding to representation 1822*d* is associated with the highest number of SCEs (as indicated by the fact that it is larger than any of the other representations 1822*a-c*).

In the case of any of the visual representations 1800, 1810, and 1820 shown in FIGS. 18A-18C, respectively, clicking on or otherwise selecting a particular phrase causes the system 200 to display one or more of the corresponding SCEs. For example, selecting one of the phrases 1802*a-c* in FIG. 18A causes the system 200 to display the corresponding SCEs; selecting one of the SCEAH names 1812*a-c* in FIG. 18B causes the system 200 to display all of the SCEs associated with that SCEAH; and selecting one of the category 1822*a-d* in FIG. 18C causes the system 200 to display all of the SCEs associated with that category.

Embodiments of the present invention may generate and display various metrics related to SCEs (FIG. 3, operations 318 and 320). For example, referring to FIG. 19A, an example is shown of a report 1900 containing a variety of such metrics, which may be generated and displayed, for example, by the module 210 based on data stored in the SCE store 212. In particular, the report 1900 shows, for each of a plurality of SCEAHs:
- the total number (count) S of SCEs sent by the SCEAH;
- the total number (count) R of SCEs received by the SCEAH;
- the "net currency" score for the SCEAH, calculated as S-R;
- the ratio S/R.

The net currency scores and ratios are examples of metrics that may be used to provide an indication of how frequently each SCEAH sends SCEs in comparison to how frequently that SCEAH receives SCEs. Displaying such metrics to the SCEAHs may encourage SCEAHs to send SCEs more frequently in an effort to increase their net scores and/or ratios.

Figures 19A, 19B:
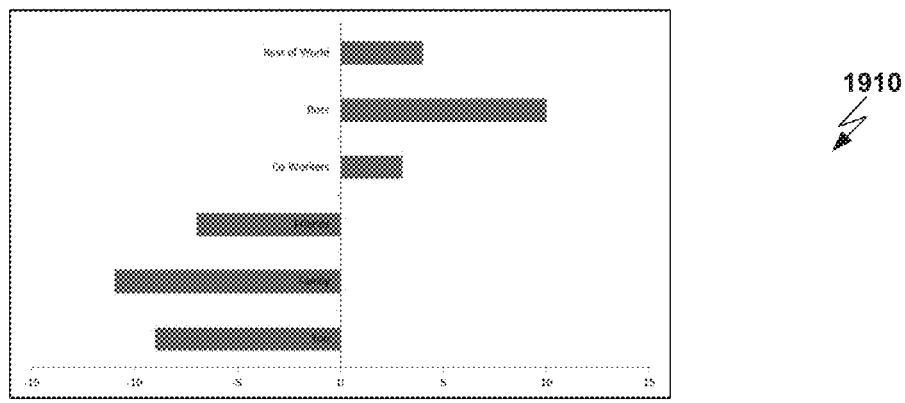
FIGS. 19A-19B illustrate various metrics related to SCEs according to one embodiment of the present invention.

Referring to FIG. 19B, an example is shown of a graph 1910 which displays the value of the net currency score, ratio, or other metric for a particular SCEAH (labeled as "You" at the bottom of the graph 1910) and for a plurality of classes of SCEAH. The module 210 may, for example, generate and display the graph 1910 based on data stored in the SCE store 212. The graph 1910 provides the particular SCEAH with an indication of how the value of that SCEAH's metric (e.g., net currency score) compares to the values of the same metric of other SCEAHs. Displaying such metric values relative to each other may encourage the SCEAH who is the focus of the graph 1910 to engage in, and to acknowledge others' engagement in, positive social behaviors more frequently in an effort to increase the value of his or her metric.

The particular metrics illustrated in FIGS. 19A and 19B are merely examples and do not constitute limitations of the present invention. As another example, when calculating a net currency score or ratio, the system 200 may weight each constituent SCE, and calculate the net currency score as a weighted sum of the constituent SCEs.

Figure 20:
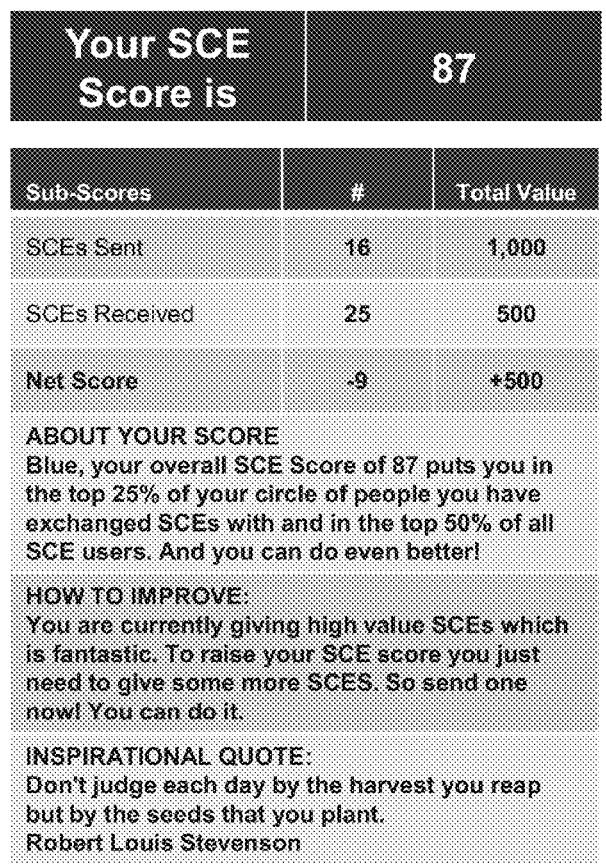
FIG. 20 illustrates a user interface for displaying a social currency score of a particular SCEAH and particular sub-scores which were used to calculate the social currency score according to one embodiment of the present invention.

Embodiments of the present invention may also generate and display, for each of one or more SCEAHs, a single "social currency score" for that SCEAH based on a variety of data. Referring to FIG. 20, an example is shown of a user interface 2000 for displaying the social currency score of a particular SCEAH, along with the sub-scores which were used to calculate the social currency score. A social currency score for a particular SCEAH may, for example, be calculated by the module 210 based on any one or more of the following variables, which may be received as input by the module 210:
- the number (count) of SCEs sent and/or received by the SCEAH;
- the absolute and/or relative sender-assigned value of SCEs sent by the SCEAH;

the absolute and/or relative recipient-assigned value of SCEs sent by the SCEAH;

the absolute and/or relative third party-assigned value of SCEs sent by the SCEAH;

the absolute and/or relative sender-assigned value of SCEs received by the SCEAH;

the absolute and/or relative recipient-assigned value of SCEs received by the SCEAH;

the absolute and/or relative third party-assigned value of SCEs received by the SCEAH;

the frequency with which the SCEAH sends and/or receives SCEs; and the amount of time since the SCEAH last sent and/or received a SCE.

In the particular example of FIG. 20, the SCEAH score for a particular SCEAH is calculated by subtracting the total number (count) of SCEs received by that SCEAH from the total number (count) of SCEs sent by that SCEAH. Regardless of the particular variables that are used to calculate a SCEAH's social currency score, embodiments of the present invention may use any formula, rule, algorithm, or other process to calculate the SCEAH's social currency score based on those variables. Such a calculation may include, for example, performing one or operations of subtraction, addition, division, and/or multiplication and any two or more of the variables described above. Embodiments of the present invention may calculate the SCEAH's social currency score repeatedly over time. Since values of the variables that are used to calculate the SCEAH's social currency score may vary over time, a particular SCEAH's social currency score may vary over time.

The management module 210 may calculate any of the metrics disclosed herein (such as an SCEAH's social currency score) repeatedly, such as continuously or periodically (e.g., every second, minute, hour, day, week, month, or year). If the management module 210 calculates two values for a particular metric at two different times, the management module 210 may calculate the total value at both times, or a total value at one time and a difference (delta) at the second time.

The management module 210 may calculate any of the metrics disclosed herein on a normalized basis, whereby the initial raw metrics are used by the management module 210 to derive one or more normalized values of those metrics. For example, consider an SCEAH named "Joe" with a particular SCE having a description field 104$i$ with a value of "Thanks for Taking out the Trash." The management module 210 may identify all SCEs (including Joe's) that are similar to the particular SCE, based on the values of one or more shared fields in the similar SCEs. For example, the management module 210 may use the value of the description field 104$i$ of the particular SCE (i.e., "Thanks for Taking out the Trash") as a query against the values of the description fields of other SCEs to find a subset of those SCEs having description fields which sufficiently match the text "Thanks for Taking out the Trash." This is merely one example of identifying a subset of SCEs which match the particular SCE based on the value of one or more fields in the particular SCE and the values of the same field(s) in other SCEs.

The management module 210 may then calculate and report the arithmetic mean, median, mode, weighted mean, or some other statistic based on the similar SCEs, and then use that statistic, and the existing value of the "To Value" field 104$d$ of Joe's "Thanks for Taking out the Trash" SCE, to calculate a normalized value for the "To Value" field 104$d$ of Joe's "Thanks for Taking out the Trash" SCE. As another example, the "To Value" field 104$d$ of the particular SCE just described may have an existing value of 234, in which case the management module 210 may calculate and report a normalized value of 114 for the "To Value" field 104$d$ of that SCE, based on the average value of the "To Value" field 104$d$ of SCEs that are similar to the "Thanks for Taking out the Trash" SCE, where such similar SCEs were identified based on similarities of key words in the "Description" fields 104$i$ of such SCEs.

The management module 210 may calculate, for any particular field in any particular SCE, any number of normalized values based on any number of sets of SCEs that are similar to the particular SCE. For example, consider an SCE sent by the sender 202. The management module 210 may calculate a first normalized value of the "To Field" of a particular SCE based on SCEs sent by co-workers of the sender 202, and calculate a second normalized value of the "To Field" of the same particular SCE based on SCEs sent by family members of the sender 202. The first and second normalized values may differ in value from each other. This ability to calculate different normalized values for the same SCE (e.g., for the same field of the same SCE) allows users of SCEs to compare their SCEs against different subpopulations that are relevant to them.

The example above is merely an example of a more general ability of embodiments of the present invention to calculate normalized values for groups of SCEs that are similar to each other. To calculate a particular set of normalized values for a particular group of similar SCEs, the management module 210 may:

Select one or more of the SCE fields 104$a$-$ab$ shown in FIG. 1A to use as a basis for identifying SCEs to include in the group of similar SCEs. The selected set of SCE fields is referred to herein as the "similarity field set."

Identify any function, rule, algorithm, or combination thereof to apply to the values of the fields in the similarity field set to determine whether any particular SCE should be included in the group of similar SCEs. The identified function, rule, algorithm, or combination thereof is referred to herein as the "similarity criteria." For example, if the similarity field set includes both the Category field 104$f$ and the Description field 104$i$, then the similarity criteria may require that the following two conditions be satisfied for a particular SCE to be included in the group of similar SCEs: (1) the value of the Category field 104$f$ of the particular SCE match a predetermined category (e.g., "trash") exactly; and (2) the value of the Description field 104$i$ of the particular SCE match a predetermined description (e.g., "take out the trash") to at least some predetermined degree of confidence (e.g., 60%). Applying the latter kind of criterion may result in two values being considered to be similar to each other even though they are not identical to each other (e.g., "take out the trash" and "taking out the garbage").

Apply the similarity criteria to the SCEs 214$a$-$n$ in the SCE store 212 (or a subset thereof), thereby producing a group of SCEs which satisfy the similarity criteria. This group of SCEs, in other words, is similar to each other according to the similarity criteria, and is referred to herein as the "similar SCE set."

The management module 210 may then calculate, for each of one or more fields in the SCEs in the similar SCE set, a normalized value of that field for each of the SCEs in the similar SCE set, based on the raw values of that field of all of the SCEs in the similar SCE set. For example, the management module 210 may calculate, for a first SCE in the similar SCE set, a normalized value of the "To Value" field of the first SCE, based on the values of the "To Value" field of all of the SCEs in the similar SCE set, and then store that normalized value (e.g., in the first SCE). The management module 210 may perform such a calculation of the normalized value of the "To Value" field for some or all of the SCEs in the similar SCE set. Additionally or alternatively, the management module 210 may calculate normalized values of fields other than the fields in the similarity field set. Such normalized values are examples of values that may be stored in SCEs even though those values were not directly assigned to the SCEs by the senders, recipients, or other users associated with those SCEs.

The management module 210 may calculate a derivative metric from a primary metric for an SCEAH, where the derivative metric represents the relative value of the primary metric to a metric calculated based on a control group of SCEAHs. For example, the management module 210 may calculate an SCEAH's average "Time duration since last SCE date" as 2 days, and determine that this value is 25% better than the national average for all SCEAHs and 10% worse than the average for all of the SCEAH's co-workers (i.e., other SCEAHs who have the same company Affiliation as the SCEAH).

The management module 210 may calculate rankings for scores (and sub-scores), whereby such scores (and sub-scores) are replaced by their ranks when the data are sorted against a set of scores from other SCEAHs. Such rankings may be used in any of the methods disclosed herein. For example, the management module 210 may sort the rankings relative to each other and display the rankings in their sorted order. The management module 210 may perform ranking using any ranking methodology, such as ordinal ranking, fractional ranking, or modified competition ranking.

The management module 210 may calculate scaled values for scores (and sub-scores), whereby the management module 210 replaces such scores (and sub-scores) with their scaled values when the scores are compared within a set of scores from other SCEAHs. Such scaled values may be used in any of the methods disclosed herein. For example, the management module may sort such scaled values relative to each other and display the scaled values in their sorted order. The management module 210 may perform scaling using any scaling methodology, such as Stanine scoring or Sten scoring.

The management module 210 may enable any of the metrics disclosed herein to be "rolled up" for one or more SCEAHs, in a manner similar to that in which financial metrics may be "rolled up" for consolidated entities comprised of numerous individual companies. For example, a "Total From Score" may be calculated for Joe and a separate "Total From Score" may be calculated for Joe and all other SCEAHs who share a similar "Affiliations" field 154*f* value. Any data field may be used to create such calculation groupings. For example, a calculation grouping may be based on the Location at which and the Time when SCEs were created (using the "Location of Creation" field 104*l* and "Date Created" field 104*e*).

The following table illustrates a variety of metrics which may be calculated by the management module 210:

| Score Name | Example Calculation Methodology | Purpose/Description |
|---|---|---|
| Total "From Value" | Summation of "From Values" of one or more SCEs held by one or more SCEAHs | The higher the better |
| Total "To Value" | Summation of "To Values" of one or more SCEs held by one or more SCEAHs | The higher the better |
| Differential between "From" and "To" Values | Subtraction of "To Value" from the "From Value" from a singular SCE. Such singular calculations then summed up on a group basis for one or more groupings of SCEs. | Zero indicates that the SCE Sender and the SCE Recipient have placed the same value on the SCE. Differentials, either positive or negative, can be useful for positively changing behavior patterns. |
| Time duration since last SCE Creation | Subtraction of last two values in the "Time of Creation" data field | Shorter time duration is indicative of greater attention to noticing other individual's actions and rewarding/encouraging them. A relative version of this score is used in the example "Overall SCE Score" calculation provided below. |
| Time duration since last SCE Date | Subtraction of last two values in the "SCE Date" data field | Shorter time duration is indicative of greater SCE activities being noticed by others. |
| Average Age of SCE Holdings | Subtraction of "SCE Date" from the Current Date for one or more SCEs and then calculating the mean, median, mode, weighed-mean or some other statistics to effectively depreciate the SCE Holdings in question. | A smaller average age is indicative of greater SCE activities being conducted recently and is to be encouraged (i.e. a good deed today is better than two a year ago) A relative version of this score is used in the example "Overall SCE Score" calculation provided below. |
| # of SCEAH Followers | Summation of the number of SCEAHs that are being followed by the SCEAH or SCEAHs | A larger number is indicative of greater connectedness to others and the likelihood that the positive actions of those individuals will increase the positive actions of the SCEAH that is following them. |
| # of SCEAH Following | Summation of the number of SCEAHs that are following the SCEAH or SCEAHs | A larger number is indicative of a greater influence on the positive actions of others |
| Ratio of Followers/Following | Calculated by dividing "# of SCEAH Followers" by "# of SCEAH Following" | A ratio at 100 indicates that the SCEAH is equally balanced between being a follower and a "leader". A ratio above 100 (i.e. 250) is indicative of the SCEAH being more of a "Leader" and a ratio below 100 of being more of a Follower. |
| Quality of Those being Followed | Calculated as the ratio of the average of the Overall SCE Scores of all SCEAHs being followed relative to all Overall SCE Scores of ALL SCEAHs. | This calculated value indicates the positive influence value of those being followed. A higher value is an indicator that the SCEAH is following SECAH's that are doing more positive things and thus the SECAH in question will experience a greater degree of being positively influenced into doing more that is more positive. Ratios above 100 are indicative of |

| Score Name | Example Calculation Methodology | Purpose/Description |
|---|---|---|
| | | higher than average quality. Ratios below 100 are indicative of lower than average quality. |
| Ratio of SCEs received from Uncategorized SCEAHs | Calculated as the ratio of number of SCE's received from SCEAH's that have not been assigned to one or more SCEAH Category Field designations divided by that number of those who have. | The calculated value indicates the acknowledgement of one's SCE by those SCEAHs outside the target SCEAH's traditional circle of acquaintances. Having good deeds acknowledged by strangers is reflective of numerous positive benefits to all parties and should be encouraged. This score does that. Ratios above 100 are indicative of greater stranger interaction. |
| Ratio of SCEs sent to Uncategorized SCEAHs | Calculated as the ratio of number of SCE's sent to SCEAH's that have not been assigned to one or more SCEAH Category Field designations divided by that number of those who have. | The calculated value indicates the acknowledgement of positive social outside on a SCEAH's traditional circle of acquaintances. Acknowledging the good deeds of strangers has numerous benefits to all parties and should be encouraged. This score does that. Ratios above 100 are indicative of greater stranger interaction. |
| Overall SCE Score | See below. | Overall SCE Scores are composite scores that provide an overall indicator of Social Currency health/standing of a singular SCEAH's or one or more Groupings of SCEAH's. |

An Overall SCE Score (OSCS) may, for example, be calculated as follows, in which the "Normalized Total From Value Score" (NTFVS) is used as the starting point for the calculation. The NTFVS may be increased and decreased based on other factors, which may be appropriately weighted. Individual factors may be added to or removed from the calculation from time to time, and the weighting of individual factors may be modified from time to time.

In general, the OSCS may, for example, be calculated as follows:

$$OSCS = NTFVS * CAF$$

The value of CAF may, for example, be calculated as follows, in which W1 through W7 are weighting factors:

$$CAF = (RTDLED*W1) + (RTDSLECT*W2) + (RFF*W3) + (Q*W4) + (RSERU*W5) + (RSESU*W6) + (RASCH*W7)$$

The entire calculation may be expanded as follows, where Di and Ej refer to the corresponding rows in the table below:

$$OSCS = D3*[(D6*E6) + (D8*E8*) + (D9*E9) + (D10*E10) + (D11*E11) + (D12*E12) + (D14*E14)]$$

| A | B | C | D | E | F |
|---|---|---|---|---|---|
| 1 | Abbr. | Full Score Name | Example Value | Example Weighting | Note Key |
| 2 | TFVS | Total From Value Score | 2,500 | n/a | N1 |
| 3 | NTFVS | Normalized Total From Value Score | 1,457 | n/a | N2 |
| 4 | | | | | |
| 5 | TDSLED | Time duration since last SCE Date | 2 | n/a | N3 |
| 6 | RTDSLED | Relative Time duration since last SCE Date | 125% | 0.5 | N4 |
| 7 | TDSLEC | Time duration since last SCE creation | 4 | n/a | N5 |
| 8 | RTDSLEC | Relative Time duration since last SCE creation | 50% | 0.25 | N6 |
| 9 | RFF | Ratio of Followers/Following | 125% | 0.3 | N7 |
| 10 | Q | Quality of Those being Followed | 75% | 0.4 | N8 |
| 11 | RSERU | Ratio of SCEs received from Uncategorized SCEAHs | 125% | 1 | N9 |
| 12 | RSESU | Ratio of SCEs sent to Uncategorized SCEAHs | 80% | 1 | N10 |
| 13 | ASCH | Age of SC Holdings | 25 | n/a | N11 |
| 14 | RASCH | Relative Age of SC Holdings | 50% | 0.1 | N12 |
| 15 | | | | | |
| 16 | NTFVS | Normalized Total From Value Score | 1,457 | <<From Above | |
| 17 | CAF | Calculated Adjustment Factor | 3.53 | <<As Calculated | |
| 18 | OSCS | Overall Social Currency Score | 5,136 | <<As Calculated | |
| 19 | | | | | |
| 20 | OSCS | Overall Social Currency Score | 5,136 | <<From Above | |
| 21 | OROSCS | Ordinal Ranked OSCS | # 4,580 | <<As Calculated | |
| 22 | SROSCS | Sten Ranked OSCS | 8 | <<As Calculated | |

The notes in the "Note Key" column of the table above are provided in the table below:

| Note Key | Description |
| --- | --- |
| N1 | Raw SCE units |
| N2 | Normalized SCE units |
| N3 | days |
| N4 | better than national average |
| N5 | days |
| N6 | worse than national average |
| N7 | SCEAH is a relative Leader |
| N8 | SCEAH is following lower quality SCEAHs |
| N9 | More strangers are acknowledging SCEs |
| N10 | Less outreach by SCEAH to strangers |
| N11 | Days |
| N12 | Better than national average |

As illustrated by FIG. 20, embodiments of the present invention may calculate two or more sub-scores for an SCEAH based on any of the variables described above, and then calculate the SCEAH's social currency score based on the sub-scores. In the particular example of FIG. 20, the system 200 has calculated the following sub-scores:

a "sent" sub-score of 1,000 based on the number of SCEs sent by the SCEAH;
  a "received" sub-score of 500 based on the number of SCEs received by the SCEAH; and
  a "net" sub-score of 500 based on the net value of the "sent" and "received" sub-scores.

Regardless of the particular sub-scores that are calculated, embodiments of the present invention may use any formula, rule, algorithm, or other process to calculate the SCEAH's social currency score based on those sub-scores.

As further illustrated in FIG. 20, embodiments of the present invention may also generate and display:

An explanation of the SCEAH's social currency score which explains, for example, how the SCEAH's social currency score compares with the social currency scores of other SCEAHs with whom the SCEAH has exchanged SCEs and with all SCEAHs.
  A recommendation to the SCEAH for improving the SCEAH's social currency score. The system 200 may select or generate such a recommendation based on any one or more of the following: the SCEAH's SCE score, the user's sub-scores, the SCEAH's percentile among SCEAHs with whom the SCEAH has exchanged SCEs, and the SCEAH's percentile among all SCEAHs of the system 200.
  An inspirational quote. The system 200 may, for example, select the quote randomly, or based on one or more properties of the SCEAH.

The illustration shown in FIG. 20 is merely one example of a way in which various scores calculated by embodiments of the present invention may be displayed. More generally, output representing scores may be manifested using visual and/or auditory output. Examples of visual output include numbers, images, graphics, and any combination thereof. For example, the Sten Ranked OSCS score described above may be represented using numbers, bars, icons, or the like, as shown in the examples in FIG. 25.

Embodiments of the present invention may also be used to calculate and display the ratio of the sender-assigned value of a SCE to its recipient-assigned value, and vice versa. For example, consider the SCE illustrated in FIG. 21. This is the SCE 214a that was sent by the sender 202 in FIG. 4 and received by the recipient 204 in FIG. 5. As shown therein, the sender 202 assigned a value of 200 to the SCE 214a, while the recipient assigned a value of 100 to the SCE 214a. As a result, the sender-recipient value ratio of the SCE 214a is 2 (i.e., 200/100), while the recipient-sender value ratio of the SCE 214a is 0.5 (i.e., 100/200). Embodiments of the present invention may calculate and display either or both of these ratios, e.g., to the sender 202 and/or the recipient 204. Furthermore, embodiments of the present invention may calculate metrics based on a plurality of such ratios, such as the average sender-recipient ratio for all SCEs sent by a particular sender or received by a particular recipient. Any such ratios may be used as a variable in the calculation of a social currency score for an SCEAH (see description of FIG. 20 above).

Figure 22:
FIG. 22 illustrates a list containing information about SCEs received by a particular recipient according to one embodiment of the present invention.

As described above, embodiments of the present invention may display various lists of SCEs. An example of one such list 2200 is shown in FIG. 22. The list 2200 displays some or all of the SCEs received by a particular recipient. The list may scroll automatically to display a rolling list of SCEs received by the recipient. The recipient SCEAH may manually speed up the scrolling of the list 2200, such as by pressing the up-arrow or down-arrow key, by rolling a scroll wheel, or by swiping on a touch screen in the desired direction. The SCEAHs may pause and unpause scrolling of the list by providing input such as pressing the spacebar, clicking a mouse button, or tapping a touch screen.

Embodiments of the present invention may generate and display various measures of comparison between different SCEAHs. For example, referring to FIG. 23, an example is shown of a table 2300 which includes a plurality of rows, each of which represents, for a distinct user of the system 200:

the SCEAH's name or other identifier;
  the SCEAH's social currency score;
  the total value of SCEs sent by the SCEAH; and
  another score, of any kind which the user wishes to view for purposes of comparison to the scores in the second and third columns of the table.

Figure 23:
FIG. 23 illustrates visual representations of metrics for use in comparing SCEs to each other according to one embodiment of the present invention.

A table such as the table 2300 shown in FIG. 23 may be used to provide one or more SCEAHs with an easy-to-understand visual representation of how different SCEAHs compare to each other. The particular metrics represented by columns of the table 2300 in FIG. 23 are merely examples and do not constitute limitations of the present invention. Embodiments of the present invention may generate tables, reports, and other output representing any combination of data, metrics, and other values stored by the system 200 for easy reference and comparison by SCEAHs.

The system 200 may generate a new SCE in response to any triggering event. For example, the system 200 may generate a new SCE in response to input received from the sender 202, such as pressing a "Create" button. As another example, the sender 202 may provide audio input to the system 202, such as by the sender 202 snapping his or her fingers or providing other audio input that the system 200 is preconfigured to recognize as a trigger for creating a new SCE. In response to receiving such audio input and determining that such audio input is a trigger for creating a new SCE, the system 200 may create a new SCE in any of the ways disclosed herein. Furthermore, the system 200 may record the sender 202's audio input, store the recording in association with the newly-created SCE, and play back the recorded audio to the recipient 204 of the SCE when the system 200 notifies the recipient 204 of the SCE and/or when the system 200 otherwise provides output to the recipient 204 in relation to the SCE.

The system 200 may recognize a plurality of audio inputs as triggers for creating new SCEs. If the sender 202 provides any such audio input to the system 200, the system 200 may create a new SCE in response. The system 200 may associate different audio inputs with different features of SCEs. For example, the system 200 may associate a first audio input (such as a snapping sound) with a first description and associate a second audio input (such as a clapping sound) with a second description. In response to receiving the first audio input, the system 200 may generate a new SCE and insert the first description into its description field 104i. In response to receiving the second audio input, the system 200 may generate a new SCE and insert the second description into its description field 104i.

The system 200 may associate audio with a SCE even if that SCE was not created in response to audio input by the sender 202. For example, when creating a new SCE, the system 200 may enable the sender 202 to select a particular audio stream to associate with the SCE via input other than audio input, such as a drop-down list containing a list of descriptions of audio streams. The sender 202 may select a particular audio stream from the list, in response to which the system 200 may associate the selected audio stream with the SCE and play back the selected audio stream to the recipient 204 in the same manner as if the audio stream had been provided as input by the sender 202 to the system 200.

More generally, the system 202 may use any of a variety of inputs as a trigger for creating a new SCE and/or as a source of content for inclusion within the SCE. For example, the system 200 may generate a SCE based on any source data, such as a document, a message (e.g., an email message, text message, or voice message), a web page, output of a computer program or computing device, or any portion or combination thereof. The sender or recipient of such source data may, for example, provide input to the system 200 representing an instruction to generate a SCE based on the source data. Alternatively, for example, the system 200 may generate a SCE automatically, such as by determining automatically that source data (such as an email message or data received from a computer program or computing device) represents praise of a user, either by the same user or another user.

Figure 24:
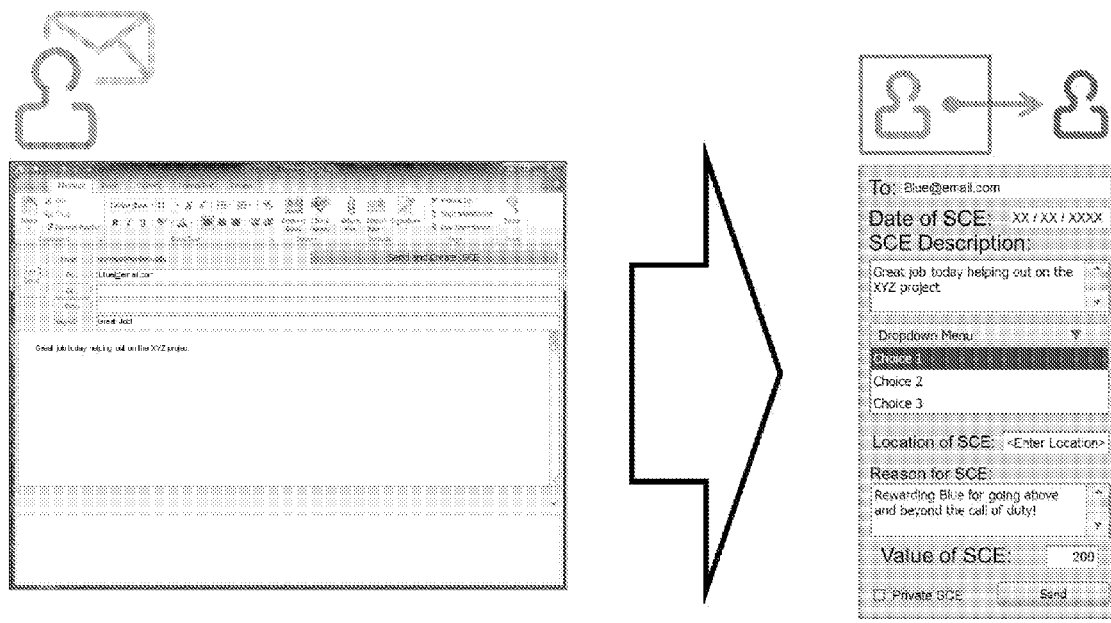
FIG. 24 illustrates automatic population of fields in an SCE based on contents of an email message according to one embodiment of the present invention.

Whether the system 200 is triggered manually or automatically to generate the SCE, the system 200 may populate some or all of the SCE based on the source data. For example, as illustrated in FIG. 24, the system 200 may:
populate the "to" field of the SCE automatically with the value of the "to" field of the source email message;
populate the "date" field of the SCE automatically with the date of the source email message;
populate the "description" field of the SCE automatically with the body of the source email message; and
populate the "category" field of the SCE with the category of the source email message.

The sender may manually edit any such fields before sending the SCE, and may manually enter data into any fields of the SCE that were not automatically populated by the system 200.

In cases in which the system 200 generates a SCE in response to manual input from the sender 202, such input may, for example, be the same input that the user provides to create and/or send the source message. For example, FIG. 24 shows an example in which the sender of a source email message selects a "Send and Create SCE" button, which causes the system 200 both to send the email message and to display the dialog box 400 of FIG. 4, which the sender may fill in and then click on "Send" to cause the system 200 to generate and send a new SCE.

Embodiments of the present invention have a variety of advantages, including one or more of the following. Embodiments of the present invention enable people to create and exchange social currency for the purposes of encouraging positive social behaviors and discouraging negative social behaviors. Whereas many existing financial currencies, virtual currencies, awards, badges, and the like at best represent social approval/disapproval of particular actions at most indirectly and ambiguously, the social currency events (SCEs) disclosed herein enable people to provide social approval/disapproval of particular actions directly and unambiguously. As a result, SCEs are more likely to be useful for encouraging positive social behaviors and discouraging negative social behaviors than existing financial currencies or other mechanisms.

Another benefit of SCEs is that they may be used by any SCEAH (e.g., human, computer, or computer program) to create recognition of any event. An SCE need not be created or authorized by any central authority. Nor do the permissible descriptions, categories, and other fields of SCEs need to be created or authorized by any central authority. Instead, an SCE may be created by any SCEAH to recognize any event, and be populated with any value(s) chosen by the SCEAH. Similarity, the recipient of an SCE may assign any value to the SCE and revise values of the SCE, as may third parties. Although certain restrictions may be imposed on the ability of certain parties to edit certain aspects of SCEs (e.g., the recipient of an SCE may be prohibited from editing the "From Value" field of the SCE), the lack of any central authority for issuing SCEs provides SCEs with a degree of flexibility, and provides the parties to SCEs with a degree of autonomy, that is not found in traditional currencies, virtual currencies, awards, badges, and the like.

Furthermore, the various scores, metrics, and other values that may be calculated, displayed, and shared among a community of users by embodiments of the present invention enables the effects of SCEs to be felt beyond the individual parties to particular transactions involving SCEs. As a result, embodiments of the present invention may be used both to spread knowledge and SCEs and to multiply the impact of SCEs in encouraging positive social behaviors and discouraging negative social behaviors by amplifying the social effects of each SCE.

Embodiments of the present invention may calculate such various scores, metrics, and other values automatically based on data stored in the SCE store 212, which may contain data representing hundreds, thousands, or more SCEs. The system 200 may calculate various scores, metrics, and other values based on such data in real-time or substantially in real-time. For example, the system 200 may calculate what is described above as a net currency score and/or a ratio S/R for a particular SCEAH in real-time or substantially in real-time (e.g., in less than a millisecond), and do so for a large number (e.g., hundreds or thousands) of SCEAHs, also in real-time or substantially in real-time. In this way, embodiments of the present invention may calculate and display aggregate information based on data stored in the SCE store 212 without any substantial delay, thereby enabling users of the system 200 to be kept updated on such aggregate information essentially instantaneously. Such real-time calculation, storage, and transmission would not be possible without the use of modern computer and communication technology. The implementation of embodiments of the present invention to perform such real-time calculation, storage, and transmission, therefore, does not "merely" implement methods on a computer which would otherwise be implementable by hand, but rather fundamentally transforms methods which would have no practical value and/or be impossible to perform without the use of modern computer and communication technology into methods which both have significant advantages and differ fundamentally from traditional techniques for creating, storing, and valuing currencies.

Furthermore, embodiments of the present invention enable the rewarding, tracking, and comparison of an individual's social events with the express purpose of encouraging and accelerating additional positive social interactions and events. In order to do so, embodiments of the present invention provide SCEAHs with various ways in which their actions can be compared and ranked, both to themselves over time and against others.

By enabling multiple parties, such as one or more senders and one or more recipients, of each SCE to assign a value to the SCE, certain embodiments of the present invention provide a built-in feedback mechanism for assigning values to SCEs that are based on input provided by at least two different parties. This mechanism protects against overvaluing and undervaluing of SCEs, and facilitates comparing the values of disparate SCEs to each other. The ability of individual parties to change the value assigned by them to individual SCEs over time further supports the ability of embodiments of the present invention to assign values to SCEs which accurately represent the values of those SCEs to the parties who have an interest in those SCEs.

Although SCEs are intended for use specifically to encourage positive social behaviors and to discourage negative social behaviors, within these confines SCEs may be used in any context in connection with any kind of social behavior. As a result, SCEs may be used to make employees more effective and happy; to build teams and make them more productive; to improve the performance of athletes; to encourage children to clean up their rooms; to increase volunteerism and non-profit donations; and to help people to lose weight, just to name a few. As these examples illustrate, SCEs are generally-applicable vehicles for storing and transferring value in approval and disapproval of social behaviors and for communicating such value to others.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

Although certain embodiments of the present invention are described as implementing a "currency," the concept of currency is merely a useful metaphor for certain embodiments of the present invention and does not constitute a limitation of the present invention. Although certain embodiments of the present invention have certain characteristics of currencies, such embodiments may also lack other characteristics of currencies and/or have characteristics lacking in currencies.

As described above, a social currency event (SCE) may represent social approval or disapproval of a behavior. An SCE may, for example, represent approval using a positive numerical value (e.g., in the "from value" field 104b and/or the "to value" field 104d) and represent disapproval using a negative numerical value (e.g., in the "from value" field 104b and/or the "to value" field 104d). These are merely examples, however, and do not constitute limitations of the present invention. Embodiments of the present invention may represent approval and disapproval using any suitable data. Although such data may take the form of simple numerical data, this is merely an example and does not constitute a limitation of the present invention. For example, values in the "from value" 104b and "to value" fields 104d may take the form of complex data structures which include one or more units of data having any combination of data types, including non-numerical data types (such as lists, arrays, and character strings).

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processing executing computer program instructions stored on at least one non-transitory computer-readable medium, the method comprising:
    (A) receiving data representing a first plurality of social currency event data structures, wherein the first plurality of social currency event data structures includes:
        data representing first values of the first plurality of social currency event data structures to a first plurality of users;
        data representing second values of the first plurality of social currency event data structures to a second plurality of users; and
        data representing a first plurality of existing values of at least one first field shared by the first plurality of social currency event data structures, wherein the receiving comprises:
    (A) (1) receiving, over a network from a first plurality of computing devices, the data representing the first values of the first plurality of social currency event data structures to the first plurality of users; and
    (A) (2) receiving, over the network from a second plurality of computing devices, the data representing second values of the first plurality of social currency event data structures to a second plurality of users;
    (B) identifying a first subset of the first plurality of social currency event data structures based on the first plurality of existing values of the at least one first field shared by the plurality of social currency event data structures;
    (C) calculating a first value of a statistic based on the first subset of the first plurality of social currency event data structures;
    (D) identifying a first plurality of existing values of a second field shared by the first plurality of social currency event data structures;
    (E) calculating a first plurality of normalized values of the second field based on the first value of the statistic and the first plurality of existing values of the second field; and
    (F) providing, over the network, at least one of the first plurality of normalized values of the second field to a third computing device.

2. The method of claim 1, wherein the at least one first field includes the second field.

3. The method of claim 1, wherein the at least one first field does not include the second field.

4. The method of claim 1, further comprising:
    (G) storing the plurality of normalized values of the second field in the first plurality of social currency event data structures.

5. The method of claim 1, wherein the statistic comprises at least one of an arithmetic mean, a median, a mode, and a weighted mean.

6. The method of claim 1, further comprising:
    (G) receiving data representing a second plurality of social currency event data structures, wherein the second plurality of social currency event data structures includes:
        data representing third values of the second plurality of social currency event data structures to a third plurality of users;
        data representing fourth values of the second plurality of social currency event data structures to a fourth plurality of users; and
        data representing a second plurality of existing values of the at least one first field shared by the second plurality of social currency event data structures;
    (H) identifying a second subset of the first plurality of social currency event data structures based on the second plurality of existing values of the at least one first field shared by the second plurality of social currency event data structures;
    (I) calculating a second value of the statistic based on the second subset of the first plurality of social currency event data structures;
    (J) identifying a second plurality of existing values of the second field shared by the second plurality of social currency event data structures; and
    (K) calculating a second plurality of normalized values of the second field based on the second value of the statistic and the second plurality of existing values of the second field.

7. The method of claim 1, wherein the first plurality of computing devices comprises the third computing device.

8. The method of claim 1, wherein the second plurality of computing devices comprises the third computing device.

9. A system comprising at least one non-transitory computer-readable medium containing computer program instructions executable by at least one computer processor to perform a method, the method comprising
    (A) receiving data representing a first plurality of social currency event data structures, wherein the first plurality of social currency event data structures includes:
        data representing a first plurality of existing values of at least one first field shared by the first plurality of social currency event data structures, wherein the receiving comprises:
    (A) (1) receiving, over a network from a first plurality of computing devices, the data representing the first values of the first plurality of social currency event data structures to the first plurality of users; and
    (A) (2) receiving, over the network from a second plurality of computing devices, the data representing second values of the first plurality of social currency event data structures to a second plurality of users;
    (B) identifying a first subset of the first plurality of social currency event data structures based on the first plurality of existing values of the at least one first field shared by the plurality of social currency event data structures;
    (C) calculating a first value of a statistic based on the first subset of the first plurality of social currency event data structures;
    (D) identifying a first plurality of existing values of a second field shared by the first plurality of social currency event data structures;
    (E) calculating a first plurality of normalized values of the second field based on the first value of the statistic and the first plurality of existing values of the second field; and
    (F) providing, over the network, at least one of the first plurality of normalized values of the second field to a third computing device.

10. The system of claim 9, wherein the at least one first field includes the second field.

11. The system of claim 9, wherein the at least one first field does not include the second field.

12. The system of claim 9, wherein the method further comprises:
(G) storing the plurality of normalized values of the second field in the first plurality of social currency event data structures.

13. The system of claim 9, wherein the statistic comprises at least one of an arithmetic mean, a median, a mode, and a weighted mean.

14. The system of claim 9, wherein the method further comprises:
(G) receiving data representing a second plurality of social currency event data structures, wherein the second plurality of social currency event data structures includes:
 data representing third values of the second plurality of social currency event data structures to a third plurality of users;
 data representing fourth values of the second plurality of social currency event data structures to a fourth plurality of users; and
 data representing a second plurality of existing values of the at least one first field shared by the second plurality of social currency event data structures;
(H) identifying a second subset of the first plurality of social currency event data structures based on the second plurality of existing values of the at least one first field shared by the second plurality of social currency event data structures;
(I) calculating a second value of the statistic based on the second subset of the first plurality of social currency event data structures;
(J) identifying a second plurality of existing values of the second field shared by the second plurality of social currency event data structures; and
(K) calculating a second plurality of normalized values of the second field based on the second value of the statistic and the second plurality of existing values of the second field.

15. The system of claim 9, wherein the first plurality of computing devices comprises the third computing device.

16. The system of claim 9, wherein the second plurality of computing devices comprises the third computing device.

* * * * *